(12) United States Patent
Hajibeygi et al.

(10) Patent No.: US 8,798,977 B2
(45) Date of Patent: Aug. 5, 2014

(54) SYSTEM AND METHOD FOR SIMULATING FLUID FLOW IN A FRACTURED RESERVOIR

(75) Inventors: Hadi Hajibeygi, Palo Alto, CA (US);
Dimitrios Karvounis, Zurich (CH);
Patrick Jenny, Zurich (CH)

(73) Assignees: Chevron U.S.A. Inc., San Ramon, CA (US); Schlumberger Technology Corporation, Houston, TX (US); ETH Zurich, Zurich (CH)

( * ) Notice: Subject to any disclaimer, the term of this patent is extended or adjusted under 35 U.S.C. 154(b) by 194 days.

(21) Appl. No.: 13/325,639

(22) Filed: Dec. 14, 2011

(65) Prior Publication Data

US 2012/0158380 A1 Jun. 21, 2012

Related U.S. Application Data

(60) Provisional application No. 61/423,748, filed on Dec. 16, 2010.

(51) Int. Cl.
*G06G 7/48* (2006.01)
*E21B 43/26* (2006.01)
*G06F 17/11* (2006.01)
*G01V 99/00* (2009.01)

(52) U.S. Cl.
CPC .............. *G06F 17/11* (2013.01); *E21B 43/26* (2013.01); *G01V 99/005* (2013.01); *G01V 2210/663* (2013.01)
USPC .......................................................... 703/10

(58) Field of Classification Search
USPC .......................................................... 703/10
See application file for complete search history.

(56) References Cited

U.S. PATENT DOCUMENTS

| | | |
|---|---|---|
| 2008/0208539 A1 | 8/2008 | Lee et al. |
| 2010/0094605 A1 | 4/2010 | Hajibeygi et al. |
| 2010/0138196 A1 | 6/2010 | Hui et al. |

FOREIGN PATENT DOCUMENTS

WO   WO 2009-155274   12/2009

OTHER PUBLICATIONS

Gulbransen et al. (SPE 119104: A Multiscale Mixed Finite-Element Method for Vuggy and Naturally-Fractured Reservoirs; Feb. 2009; 10 pages.*
Popov et al.; Multiscale Modeling and Simulations of Flows in Naturally Fractured Karst Reservoirs; Com. Comp. Phys.; pp. 162-184; Jul. 2009.*
Lee et al.; Efficient Finite-Difference Model for Flow in a Reservoir With Multiple Length-Scale Fractures SPE Journal 5 (3); 2000; pp. 268-275.*

(Continued)

*Primary Examiner* — Hugh Jones
(74) *Attorney, Agent, or Firm* — Ana C. Jacquez

(57) ABSTRACT

A method, system and computer program product are disclosed for simulating fluid flow in a fractured subterranean reservoir. A reservoir model representative of a fractured subterranean reservoir is provided. The reservoir model includes porous matrix control volumes and a network of fractures, which define fracture control volumes, overlying the porous matrix control volumes. A system of equations based on scale separation is constructed for fluid flow in the porous matrix control volumes and the fracture control volumes. The system of equations can include fracture equations having a pressure vector for each network of fractures that is split into an average pressure value and remainder pressure value. The system of equations based on scale separation is sequentially solved, such as by using an iterative Multi-Scale Finite Volume (MSFV) method.

20 Claims, 26 Drawing Sheets

(56) References Cited

OTHER PUBLICATIONS

Landeresu et al.: Quasi-steady two-equation models for diffusive transport in fractured porous media: large-scale properties for densely fractured systems; Advances in Water Resources, vol. 24, No. 8, 2001; pp. 863-876.*

Hauge et al.; Modeling of two-phase flow in fractured porous media on unstructured non-uniformly coarsened grids; Transp. Porous Med. (2009) 77: pp. 373-398 (online 2008).*

Monteagudo et al.; Control-Volume Model for Simulation of Water Injection in Fractured Media: Incorporating Matrix Heterogeneity and Reservoir Wettability Effects; SPE-98108-PA; 2007, pp. 355-366.*

Reichenberger et al.; A mixed-dimensional finite volume method for two-phase flow in fractured porous media; Advances in Water Resources 29 (2006) pp. 1020-1036.*

Reichenberger; Numerical Simulation of Multiphase Flow in Fractured Porous Media; PhD Thesis; Ruprecht-Karls-Universität Heidelberg; 2003; 149 pages.*

Hajibeygi Hadi et al., A hierarchiacal fracture model for the interative multi scale finite volume method. Journal of Computational Physics, Oct. 2011, vol. 230, issue 24, pp. 8729-8743. See p. 8729, line 1-p. 8742, line 26 and figures 1, 3.

PCT Notification of Transmittal of the International Search Report and the Written Opinion of the International Searching Authority or the Declaration regarding PCT/US2011/064956 dated Sep. 3, 2012 (11 pgs).

Hajibeygi, H., et al.; "A Hierarchical Fracture Model for the Iterative Multiscale Finite Volume Method"; Journal of Computational Physics, 2011, vol. 230, pp. 8729-8743.

Hajibeygi, H., et al.; "A Loosely Coupled Hierarchical Fracture Model for the Iterative Multiscale Finite Volume Method"; SPE 141991-PP, 2011, pp. 1-9.

Hajibeygi, H.; "Iterative Multiscale Finite Volume Method for Multiphase Flow in Porous Media with Complex Physics"; Dissertation (Part 1 of 6), 2011, Diss. ETH No. 19872, pp. 1-10, Table of Contents, pp. I-III, List of Figures, pp. IV-XVIII.

Hajibeygi, H.; "Iterative Multiscale Finite Volume Method for Multiphase Flow in Porous Media with Complex Physics"; Dissertation (Part 2 of 6), 2011, Diss. ETH No. 19872, pp. 1-32.

Hajibeygi, H.; "Iterative Multiscale Finite Volume Method for Multiphase Flow in Porous Media with Complex Physics"; Dissertation (Part 3 of 6), 2011, Diss. ETH No. 19872, pp. 33-62.

Hajibeygi, H.; "Iterative Multiscale Finite Volume Method for Multiphase Flow in Porous Media with Complex Physics"; Dissertation (Part 4 of 6), 2011, Diss. ETH No. 19872, pp. 63-92.

Hajibeygi, H.; "Iterative Multiscale Finite Volume Method for Multiphase Flow in Porous Media with Complex Physics"; Dissertation (Part 5 of 6), 2011, Diss. ETH No. 19872, pp. 93-122.

Hajibeygi, H.; "Iterative Multiscale Finite Volume Method for Multiphase Flow in Porous Media with Complex Physics"; Dissertation (Part 6 of 6), 2011, Diss. ETH No. 19872, pp. 123-154.

* cited by examiner $<d> = dx/4$ (A)

$<d> = (dx_2^2 + dx_1^2)/(2dx)$ (B)

$dx = dy$
$<d> = dx/3\sqrt{2}$ (C)

$<d> = dxdy/(3\sqrt{dx^2 + dy^2})$ (D)

(A)

(B)

(C)

(D)

SYSTEM AND METHOD FOR SIMULATING FLUID FLOW IN A FRACTURED RESERVOIR

CROSS-REFERENCE TO A RELATED APPLICATION

The present application for patent claims the benefit of U.S. Provisional Application bearing Ser. No. 61/423,748, filed on Dec. 16, 2010, which is incorporated by reference in its entirety.

TECHNICAL FIELD

This disclosure relates to a method, system and computer program product for performing simulations of fluid flow in fractured porous media, and more particularly, to sequentially solving a system of equations based on scale separation to simulate fluid flow in fractured porous media.

BACKGROUND

The field of hydrocarbon production is directed to retrieving hydrocarbons that are trapped in subsurface reservoirs. These hydrocarbons can be recovered by drilling wells into the reservoirs such that hydrocarbons are able to flow from the reservoirs into the wells and up to the surface. The geology of a reservoir has a large impact on the production rate at which hydrocarbons are able to flow into a well. A large amount of effort has therefore, been dedicated to developing reservoir characterization and simulation techniques to better predict how fluid will flow within a reservoir.

Highly complex geological subsurface reservoirs, such as reservoirs having a network of fractures, present unique and specialized challenges with regards to simulating fluid flow. A fractured reservoir is a reservoir in which fractures enhance the permeability field, thereby significantly affecting well productivity and recovery efficiency. Fractures can be described as open cracks or voids embedded within the rock matrix, and can either be naturally occurring or artificially generated from a wellbore. Natural fractures typically occur in sets of parallel fractures that can range several orders of magnitude in size. The length distribution within a fracture set is characteristically non-linear, with many short fractures and a diminishing number of large fractures. The range of fracture apertures is distributed in a similar manner. Furthermore, several fracture sets can coexist in a rock forming connected networks of significant extent and complexity. Fracture networks can play an important role in allowing fluids to flow through the reservoir to reach a well. For example, a well that intersects a fracture network often produces fluid at a rate that greatly exceeds the rate of flow within the rock matrix, as the fracture network typically has a much greater capability to transport fluids. Accordingly, a network of multiple intersecting fractures often forms the basis for flow in fractured reservoirs.

Mathematical formulations describing flow in naturally fractured porous media are typically governed by highly heterogeneous anisotropic tensorial coefficients (hydraulic conductivity) at different scales. In addition to the complex geometries of fracture networks, the high contrast in the physical properties and length scales, compared to those of the reservoir matrix, results in very expensive fine-scale simulations. Therefore, many studies have been dedicated to reduce the physical and numerical complexities arising in simulation of flow in fractured reservoirs. As a result various modeling approaches and numerical strategies suitable for different types of fractures have been proposed.

Among the proposed approaches, a dual porosity model approach has been proposed for naturally fractured porous media containing many small fractures. This method introduces effective coefficients for (n−1) dimensional (D) fractures by mapping them into a continuum domain (nD). This upscaling based strategy results in reasonably efficient simulations with the cost of additional assumptions. However, this method is generally only appropriate for problems with small scale fractures. For problems with long scale fractures, this approach typically fails to provide good solutions as no general upscaling strategy is possible in this approach.

A discrete fracture modeling approach has also been devised to obtain more accurate simulations. In this approach, the geometry and locations of fractures are honored accurately by applying complex unstructured gridding techniques. In particular, the grid is generated with the constraints that the fracture elements are located at the matrix cell interfaces and such that the matrix cells around the fractures are constructed small enough to capture the correct fracture geometries. The latter constraint often results in very small cells, especially near intersections. Such small cells can lead to big linear systems and can also impose time step restrictions for multiphase transport simulations. This approach, therefore, has limited applicability for realistic scenarios due to the complex conforming grids. Moreover, this approach is typically not suited for dynamic fracture network problems, such as in simulations of enhanced geothermal systems, where the grid is frequently updated due to generations of new fractures.

Another proposed approach utilizes a hierarchical fracture network model. In this method, small scale fractures are homogenized and treated as a continuous matrix with effective coefficients. Large-scale fractures are explicitly represented by a coupled discrete fracture model. In particular, simple structured nD and (n−1)D grids are independently generated for matrix and fractures, respectively. In this method, the fracture lines can be located independent of the reservoir matrix grid and therefore, no additional complexity is introduced into the reservoir matrix grid.

The aforementioned methods, including treating fractures explicitly by complex grids (discrete fracture network modeling), by source terms (hierarchical approach), or by a combination of both (hybrid methods), often result in large systems that are typically expensive to solve when applied to realistic problems. A new computationally efficient method for simulations of realistic multiphase flow in fractured heterogeneous porous media is therefore needed.

SUMMARY

A method for simulating fluid flow in a fractured subterranean reservoir is disclosed. The method comprises providing a reservoir model representative of a fractured subterranean reservoir. The reservoir model includes porous matrix control volumes and a network of fractures overlying the porous matrix control volumes. The network of fractures defines fracture control volumes. A system of equations based on scale separation is constructed for fluid flow in the porous matrix control volumes and the fracture control volumes. The system of equations based on scale separation is then sequentially solved.

A system for simulating fluid flow in a fractured subterranean reservoir is also disclosed. The system comprises a database, a computer processor and a computer program executable on the computer processor. The database is configured to store data comprising a reservoir model representative of a fractured subterranean reservoir. The reservoir model includes porous matrix control volumes and a network of fractures overlying the porous matrix control volumes. The network of fractures defines fracture control volumes. The computer program comprises a fracture module. The fracture module is configured to construct a system of equations based on scale separation for fluid flow in the porous matrix control volumes and the fracture control volumes. In some embodiments, the computer program further comprises an iterative multi-scale finite volume module, which is configured to solve sequentially the system of equations based on scale separation.

A computer program product for simulating fluid flow in a fractured subterranean reservoir is also disclosed. The computer program product comprises a non-transitory computer usable medium having a computer readable program code embodied therein. The computer readable program code comprises a fracture module. The fracture module is configured to construct a system of equations based on scale separation for fluid flow in porous matrix control volumes and fracture control volumes of a reservoir model representative of a fractured subterranean reservoir. The system of equations based on scale separation can then be sequentially solved.

In one or more embodiments, the system of equations based on scale separation comprises matrix equations and fracture equations coupled via flux interactions between the matrix control volumes and the fracture control volumes.

In one or more embodiments, the system of equations based on scale separation comprises fracture equations having a pressure vector for each network of fractures that is split into an average pressure value $\bar{p}^{f,i}$ and remainder pressure value $\hat{p}^{f,i}$.

In one or more embodiments, solving sequentially the system of equations based on scale separation comprises computing a pressure field for fluids in the fractured subterranean reservoir. For example, the pressure field can be approximated for fluids on a coarse-scale grid according to the following equation:

$$p^{m,\nu+1} \approx p^{tm,\nu+1} = \sum_{h=1}^{N_d}\left(\sum_{k=1}^{N_c}\Phi_k^h \bar{p}_k^{\nu+1} + \sum_{\beta=1}^{N_{fn}}\bar{p}^{f,\beta,\nu+1}\Phi_{f,\beta}^h \Phi^{h,\nu}\right)$$

where $\Phi_k^h$ represents basis functions, $\Phi_{f,\beta}^h$ represents fracture functions, and $\Phi^{h,\nu}$ represents correction functions.

In one or more embodiments, solving sequentially the system of equations based on scale separation comprises computing local fracture functions on a coarse-scale grid.

In one or more embodiments, an iterative multi-scale finite volume method is used for solving sequentially the system of equations based on scale separation.

In one or more embodiments, solving sequentially the system of equations based on scale separation comprises (a) splitting a pressure vector for the network of fractures into an average pressure value and remainder pressure values; (b) approximating a pressure field on a coarse-scale grid responsive to a matrix pressure vector and the average pressure value for the network of fractures; (c) obtaining a fine-scale pressure solution responsive to the pressure field on the coarse-scale grid; (d) computing the remainder pressure values for the network of fractures; (e) smoothing the fine-scale pressure solution; and (f) repeating steps (b) through (e) until the remainder pressure values have converged to a convergence criterion.

DETAILED DESCRIPTION

Figure 1:
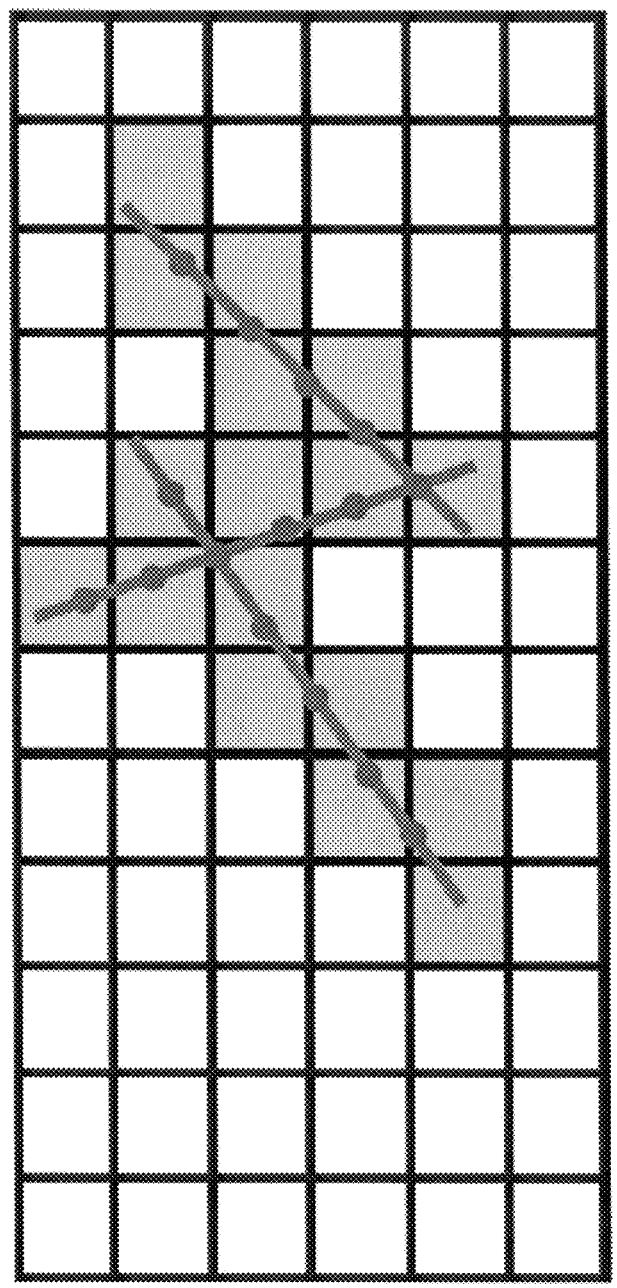
FIG. 1 is a schematic of matrix control volumes overlapping with fracture segments, according to an embodiment of the present invention.
Figure 2:
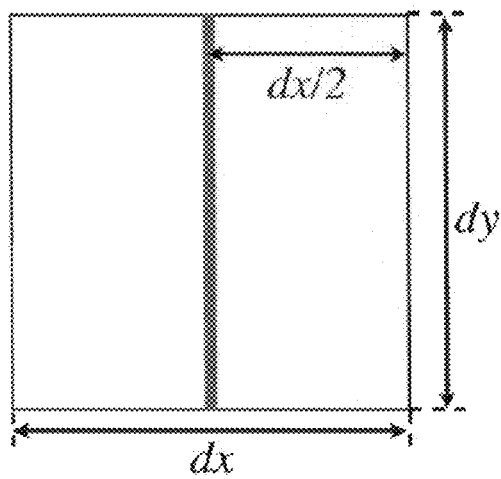
FIGS. 2A-2D illustrate analytical expressions to compute distances between matrix cells and fracture segments, according to embodiments of the present invention.
Figure 2:
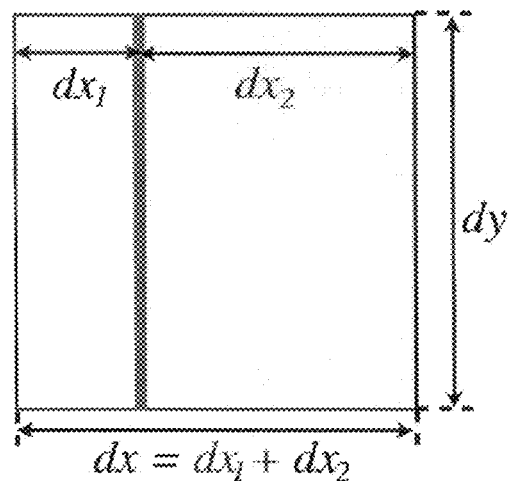
Figure 2:
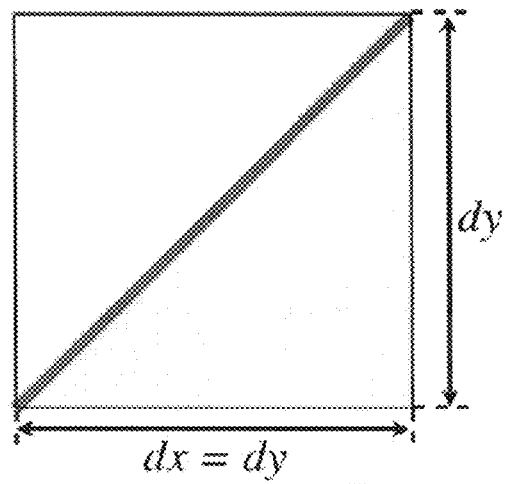
Figure 2:
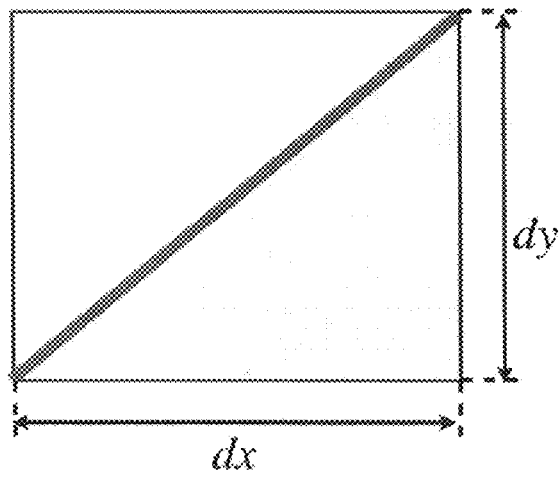

A method, system and computer program product are disclosed for use in simulating fluid flow in a fractured porous media of a subterranean reservoir. As used herein, the term "simulate" (as well as forms, derivatives, or variations thereof, such as "simulation" or "simulating"), generally refers to mathematical representations of fluid flow (e.g., oil, gas, water) in a geological formation of a physical subterranean reservoir. More particularly, "simulate" refers to the application of numerical methods for computing nonlinear partial differential equations (PDE's) that comprise a plurality of variables representing fluid flow properties in the subterranean reservoir. For example, numerical methods can be used to discretize the PDE's into algebraic equations (e.g., a linear system of fluid flow equations). Furthermore, numerical methods can be used to solve the algebraic equations to obtain solutions (e.g., values of pressure and phase saturation at discrete points in the reservoir and at discrete times), which represent the reservoir behavior. The term "simulate" is inclusive of using one or more computation modules, such as a linear solver, which can be used in serial or parallel versions of a reservoir simulator.

As will be described, a hierarchical fracture modeling approach, which is suited to be combined with multi-scale physics to analyze fluid flow within a subterranean reservoir and leads to enhanced convergence rates for highly conductive fractures, is disclosed. Combining a hierarchical fracture model with a multi-scale method for reservoir simulation is useful, as multi-scale methods are capable of honoring fine-scale transmissibility variations with much fewer degrees of freedom (DOF) than classical simulators. Such fine-scale variations become an even bigger issue in highly fractured reservoirs. In order to properly deal with transport, it is desirable to work with a multi-scale method which delivers conservative fine-scale velocity fields. Therefore, the Multi-Scale Finite-Volume (MSFV) method is used herein as it typically requires fewer DOF and is generally more conservative compared to other multi-scale methods. Moreover, the error can systematically be reduced in the MSFV framework and conservative solutions can be constructed after any iteration (i.e., it is not required to fully converge).

In the disclosed embodiments, one additional constraint per fracture network is added to the matrix equations, which provides sufficient coupling to achieve good convergence rates. The term "couple" (as well as forms, derivatives, or variations thereof, such as "coupled" or "coupling"), as used herein, is defined as being operatively linked or interconnected, such that information from the matrix model is utilized by the fracture model during operation, and/or vice versa. Accordingly, "coupling" creates interdependency between the models. Thus, the models rely upon sharing of information, such as through exchange of data or key parameters (e.g., boundary conditions). For example, as will be described, matrix and fracture equations can be solved sequentially and only one additional degree of freedom (DOE) per fracture network exists in the matrix system. This approach results in much smaller matrix systems and minimizes the additional complexity due to fractures. For highly conductive fractures, the convergence properties of the disclosed method typically outperform tightly coupled methods.

In one embodiment, the hierarchical fracture method with sequential coupling utilizes an iterative Multi-Scale Finite Volume (i-MSFV) method. To capture fractures accurately at the coarse-scales, local fracture functions are introduced. The fracture functions are solved within local problems, similar to basis and correction functions, based on the full governing equations (with fracture-matrix couplings) subject to reduced problem boundary conditions. Inner and outer iterations are applied to enhance the correction function boundary conditions and for the convergence of the sequentially-coupled fracture-matrix system, respectively.

In some embodiments, a classical iterative fine-scale solver is used as a smoother to promote convergence. For example, line-relaxation can be used a smoother, since it is very robust for problems with stretched grids. Krylov sub-space methods, such as Generalized Minimal Residual (GMRES), Flexible Generalized Minimal Residual (FGMRES), Orthogonal Minimization (ORTHOMIN), Bi-Conjugate Gradient Stabilized (Bi-CGSTAB), or Generalized Conjugate Residual (GCR), can also be used to stabilize the system.

Hierarchical Fracture Modeling
Governing Equations and Modeling Parameters

To explain an embodiment of the method, total mass balance for fluid flow (i.e., all phases) together with Darcy's law lead to the elliptic equation:

$$-\nabla \cdot (K\lambda_t \cdot \nabla p) = q_t \text{ on } \Omega \subset \mathbb{R}^n \qquad \text{(Equation 1)}$$

with $\nabla p \cdot n = \zeta_1$ and $p = \zeta_2$ at the boundaries $\partial \Omega_1$ and $\partial \Omega_2$, respectfully. Note that $\partial \Omega = \partial \Omega_1 \cup \partial \Omega_2$ is the whole boundary of the domain $\Omega$ and $\partial \Omega_1 \cap \partial \Omega_2 = \emptyset$. Compressibility, gravity, and capillary effects are neglected in Equation 1. Moreover, n is the unit normal vector at $\partial \Omega$ pointing outwards, K is the positive definite permeability tensor, $\lambda_t$ is the total mobility, p is the pressure, $q_t$ is the total volumetric source term, and $\zeta_1$ and $\zeta_2$ are specified quantities at the boundary.

In fractured porous media the length scales and permeability fields entail high contrasts. Therefore, in the hierarchical fracture modeling approach small scale fractures are homogenized and represented as part of the continuum described by the effective matrix coefficients $K^m \in \mathbb{R}^n$. For large fractures a discrete lower dimensional representation with effective conductivities $K^f \in \mathbb{R}^{n-1}$ is employed. The effective conductivity is related to the fracture aperture a as $K^f = a^2/12 I$, with I being the identity matrix. Equation 1 can be separated for flow in the matrix and long fractures. For example, separation can be performed using the following coupled system of equations:

$$-\nabla \cdot (K\lambda_t \cdot \nabla p)^m + \Psi^{mf} = q_t^m \text{ on } \Omega^m \subset \mathbb{R}^n \quad \text{(Equation 2)}$$

and $$-\nabla \cdot (K\lambda_t \cdot \nabla p)^f + \Psi^{fm} = q_t^f \text{ on } \Omega^f \subset \mathbb{R}^{n-1} \quad \text{(Equation 3)}$$

where $\Psi^{mf}$ and $\Psi^{fm}$ are the flux interactions between large scale fractures and the matrix, and superscripts m and f represent matrix and fracture quantities, respectively. Here, the fracture equation is solved on the lower dimensional fracture manifolds while the homogenized small scale fractures are treated by the matrix equation.

In the hierarchical fracture modeling approach, flux interaction between fracture and matrix elements is modeled, similar to how well-block pressure is modeled in relation to bottomhole pressure in a Peaceman well model. For example, given a volume V intersecting with a fracture interface A, the volume averaged source can be written as:

$$\Psi_V^{mf} = CIK^m \lambda_t^m (p^m - p^f)/V = \eta^m (p^m - p^f) \quad \text{(Equation 4)}$$

in the discretized matrix pressure equation and the areal averaged source $$\Psi_A^{fm} = CIK^m \lambda_t^m (p^f - p^m)/A = \eta^f (p^f - p^m) \quad \text{(Equation 5)}$$

in the discretized fracture pressure equation. Here, CI is the connectivity index (analogous to the well productivity index, PI, in a well model), which is a measure of the total flux between fracture element of area A and matrix element of volume V normalized by the pressure difference and the matrix parameter $K^m \lambda_t^m$. Accordingly, the matrix element of volume V is used to normalize the flux interaction $\Psi^{mf}$ and similarly, the fracture element of interfacial area A is used to normalize the flux interaction $\Psi^{fm}$. Thus, consistency of the total flux between fractures and matrix (after integration over corresponding control volumes) in both equations is obtained:

$$\int_V \Psi_V^{mf} dV = -\int_A \Psi_A^{fm} dA. \quad \text{(Equation 6)}$$

The connectivity indices CI ([CI]=$L^J$) are grid dependent quantities. To illustrate how they can be computed, FIG. 1 shows a 2D problem with one fracture network having three connected fracture lines. The matrix is discretized by a Cartesian grid and the fractures are independently divided into connected fracture segments. The matrix volumes overlapping with the fracture segments are shown in gray. The flux interaction $\Psi^{mf}$ is non-zero in matrix volumes that overlap with at least one fracture segment (the same holds for flux interaction $\Psi^{fm}$). The connectivity index $CI_{i-j}$ is calculated based on the area fraction of the fracture element i inside the matrix cell j. Therefore, the connectivity index can be written as $$CI_{ij} = \frac{A_{i-j}}{\langle d \rangle} \quad \text{(Equation 7)}$$

where $A_{i-j}$ is the fraction of interfacial area of fracture element i overlapping with the matrix volume j. The distance $\langle d \rangle$ is the average distance between the matrix volume j and fracture element i, which can be computed as $$\langle d \rangle = \frac{\int_V x_n(x') dx'}{V} \quad \text{(Equation 8)}$$

where $x_n$ is the distance from the fracture. For highly connected fractures and matrix cells, the effect of $\langle d \rangle$ is small, as long as it is larger than a minimal value. In general, distance $\langle d \rangle$ is typically computed numerically. However, analytical expressions exist in many cases. FIGS. 2A-2D show example analytical expressions of $\langle d \rangle$ for various 2D scenarios.

Once the pressure equations are solved, the total velocity $u_t = K\lambda_t \cdot \nabla p$ and the phase velocities $u_\alpha = f_\alpha u_t$ can be computed, where $f_\alpha = \lambda_\alpha/\lambda_t$ is a fractional flow function. Here, $\lambda_t = \sum_{\alpha=1}^{N_{ph}} \lambda_\alpha$ is a system with $N_{ph}$ phases where $\lambda_\alpha$ depends on the phase saturation $S_\alpha$ and viscosity $\mu_\alpha$. The transport equations can be solved either explicitly or implicitly. For example, an explicit scheme can be employed leading to a sequential implicit-pressure-explicit-saturation (IMPES) overall solution strategy, whereas the fractional flow functions can be interpolated to the cell interfaces using a second-order total variation diminishing (TVD) scheme.

Discretized Linear System

A reservoir domain with $N_{fn}$ disconnected fracture networks is provided. Each fracture network may be governed by one or several connected fracture lines (planes in 3D). Employing a computational grid, the matrix and the i-th fracture network consist of $N_m$ and $N_{f,i}$ grid cells, respectively. The computational grids for the matrix and each fracture network are independent.

Equations (2) and (3) discretized on the fine grid using a classical finite volume scheme results in a system of equations for fracture and matrix pressure vector P, which can be written as $$BP = Q \quad \text{(Equation 9)}$$

where B and Q are the system matrix and the right-hand-side (RHS) vector, respectively. Equation (9) can be ordered in a way such that the matrix equations appear first followed by the fracture network equations. For example, for $N_{fn}$ disconnected fracture networks, Equation (9) can be ordered as follows:

$$\begin{pmatrix} B_{MM} & B_{MF}^1 & \cdots & B_{MF}^{N_{fn}} \\ B_{FM}^1 & B_{FF}^1 & \cdots & 0 \\ \vdots & \vdots & \ddots & \vdots \\ B_{FM}^{N_{fn}} & 0 & \cdots & B_{FF}^{N_{fn}} \end{pmatrix} \begin{pmatrix} p^m \\ p^{f,1} \\ \vdots \\ p^{f,N_{fn}} \end{pmatrix} = \begin{pmatrix} Q^m \\ Q^{f,1} \\ \vdots \\ Q^{f,N_{fn}} \end{pmatrix}, \quad \text{(Equation 10)}$$

where $B_{MM} = A_{MM} + D_{MF}$ and $B_{FF}^i = A_{FF}^i + D_{FM}^i$ with $i \in \{1, \ldots, N_{fn}\}$. The super-indices "m" and "f,i" for the P and Q vectors denote the entries belonging to the matrix cells and i-th fracture network, respectively. The super-index "i" in $B_{MF}^i$ indicates the i-th fracture network. The matrices $A_{MM}$ and $A_{FF}^i$ account for matrix-matrix and fracture-fracture transmissibilities, respectively, while $D_{MF}$, $D_{FM}^i$ and $B_{MF}^i = B_{FM}^i$ account for matrix-fracture connections. The diagonal matrices $D_{MF}$ and $D_{FM}^i$ reflect the matrix-fracture connections in the diagonal of the system.

With the classical numerical approach, the problem size, $N_{t,tight}$, is equal to the summation of all $N_m$ matrix nodes and fracture elements of all $N_{fn}$ fracture networks, which can be written mathematically as $$N_{t,tight} = N_m + \sum_{i=1}^{N_{fn}} N_{f,i}. \quad \text{(Equation 11)}$$

This system can become huge and thus, can lead to expensive simulations. Moreover, the convergence rate of iterative-linear solvers may be negatively affected by the high contrast between matrix-matrix and fracture-fracture connections. In particular, the fracture sub-blocks of the system have extreme contrast with respect to the matrix sub-blocks in the presence of high-conductive fractures, which can deteriorate the condition number of the system. In addition, the matrix system itself is typically too expensive to be solved in realistic scales due to the resolution of the fine grid. Additional complexities introduced by fractures should be minimized to achieve efficient simulations.

Matrix-Fracture Coupling Based on Scale Separation

To improve the simulation efficiency, a hierarchical fracture method with sequential coupling is presented in accordance with embodiments of the present invention, which results in much smaller equation systems and in improved convergence rates when in the presence of highly conductive fractures. In particular, the hierarchical fracture method uses sequential matrix-fracture coupling based on scale separation of the fracture pressure. For each fracture network, the pressure distribution maintains mass balance. In other words, for incompressible systems without external source terms, the total volumetric exchange rate with the matrix is zero. This can be achieved by adjusting the reference pressure levels in each fracture network accordingly. The pressure distribution $p^{f,i}$ inside each fracture network i is split into an average value $\bar{p}^{f,i}$ and remainder value $\hat{p}^{f,i}$, which can be written as $$p^{f,i} = (\bar{p}^{f,i} + \hat{p}_1^{f,i}, \bar{p}^{f,i} + \hat{p}_2^{f,i}, \ldots, \bar{p}^{f,i} + \hat{p}_{N_{f,i}}^{f,i})^T \quad \text{(Equation 12)}$$

Equation 12 can be reformulated as $$\begin{pmatrix} B_{MM} & {}^c\sum B_{MF}^1 & \cdots & {}^c\sum B_{MF}^{N_{fn}} \\ {}_r\sum B_{FM}^1 & {}_r^c\sum B_{FF}^1 & \cdots & 0 \\ \vdots & \vdots & \ddots & \vdots \\ {}_r\sum B_{FM}^{N_{fn}} & 0 & \cdots & {}_r^c\sum B_{FF}^{N_{fn}} \end{pmatrix} \begin{pmatrix} p^m \\ \bar{p}^{f,1} \\ \vdots \\ \bar{p}^{f,N_{fn}} \end{pmatrix} = \quad \text{(Equation 13)}$$

$$\begin{pmatrix} Q^m - \sum_{i=1}^{N_{fn}} (B_{MF}^i \hat{p}^{f,i}) \\ {}_r\sum Q^{f,1} \\ \vdots \\ {}_r\sum Q^{f,N_{fn}} \end{pmatrix}.$$

where the operators ${}^c\Sigma$, ${}_r\Sigma$ and ${}^c_r\Sigma$ indicate summation over columns, rows and both, respectively. This is a system for the matrix and mean fracture network pressures. To obtain the fracture pressure remainders, the following system can be solved $$B_{FF}^i \hat{p}^{f,i} = Q^{f,i} - (B_{FM}^i \quad {}^c\sum B_{FF}^i) \begin{pmatrix} p^m \\ \bar{p}^{f,i} \end{pmatrix} \quad \text{(Equation 14)}$$

$$\forall i \in \{1, \ldots, N_{fn}\}$$

for each fracture network independently. The system of equations (Equation 13 and 14) can then be solved sequentially until convergence.

The size of the system for the matrix and mean fracture network pressures (Equation 13) is equal to:

$$N_{m,loose} = N_m + N_{fn} \quad \text{(Equation 15)}$$

which generally is much smaller than that of the system obtained with the classical numerical approach (Equation 10), particularly because it only contains one degree of freedom (DOF) per fracture network in the matrix equation. This additional DOF strictly ensures total mass balance for each fracture network at any iteration level, which is an important property to achieve good convergence rates of the iterative solver. However, this splitting approach can be refined by allowing for spatial variations of $\bar{p}^{f,i}$ within network i, which results in additional DOFs.

Generally, as the contributions of remainder $\hat{p}^{f,i}$ decrease, the better the expected convergence rate of the sequential procedure will be. As a direct consequence, as will be discussed later herein, the approximation by the mean fracture network pressure is better in cases with high fracture connectivities (small pressure gradients).

Multi-Scale Finite Volume Method for Fractured Porous Media

Natural porous media are typically anisotropic and heterogeneous at different scales. Fractures add more complexity to the problem and even with the hierarchical fracture method using sequential coupling, the matrix system of equations (Equation 13) may still be large and expensive to solve with classical numerical schemes. Therefore, in some embodiments, an iterative MSFV (i-MSFV) method is used. The i-MSFV method is conservative at any iteration level, allows for reducing errors locally and thus, can be used to efficiently obtain approximate, but still highly accurate, solutions for realistic problems by iteratively reducing MSFV errors.

Furthermore, the hierarchical fracture method with sequential coupling can easily be integrated in the iterative Multi-Scale Finite Volume (i-MSFV) framework. In general, the i-MSFV method is implemented as follows. First, the fine-scale pressure is initialized (e.g., set to zero). All basis functions are computed and the right-hand side of the elliptic pressure equation is integrated over each coarse volume. These steps have to be performed only once and can then be followed by the main iteration loop. At the beginning of each iteration, $n_s$ smoothing steps are applied and the smoothed fine-scale pressure is employed to compute the correction functions. The corrective functions are utilized to obtain the right-hand side of the linear system for the coarse pressure. At the end of each iteration, the coarse system is solved and the new fine-scale pressure approximation is reconstructed. The components of the vector $\bar{p}$ are preferably the actual pressure values at the dual coarse-grid nodes. This process can be expressed in algorithmic form such that it can be employed for use in a reservoir simulator to simulate fluid flow within a subterranean reservoir:

--- initialize $p'^{(t=0)}$
$\forall h : \forall k$ : compute basis functions $\Phi_k^h$
calculate Q;
for t = 1 to number of i-MSFV iterations {
    $p'_s{}^{(t-1)} = p'^{(t-1)}$
    for i = 1 to $n_s$ {
        $p'_s{}^{(t-1)} = S \cdot p'^{(t-1)}$ ; smoothing step
    }
    $\forall h$ : compute correction function $\Phi^{h(t-1)}$ ; based on $p'_s{}^{(t-1)}$
    calculate $b^{(t-1)} = Q + DC \cdot p'_s{}^{(t-1)} + DE$ ;
    solve coarse system $A \cdot \bar{p}^{(t)} = b^{(t-1)}$ ;
    reconstruct $p'^{(t)}$ ;
}

Additional details on the iterative Multi-Scale Finite Volume (i-MSFV) framework are disclosed in U.S. patent application Ser. No. 12/575,970, which is hereby incorporated by reference.

Iterative Multi-Scale Finite Volume Framework for Fractured Reservoirs

The i-MSFV method can be constructed based on the solution of Equation 2 after applying the hierarchical fracture method with sequential coupling (Equation 13), which can be approximated by $$p^{m,\nu+1} \approx p^{tm,\nu+1} = \sum_{h=1}^{N_d}\left(\sum_{k=1}^{N_c}\Phi_k^h \check{p}_k^{\nu+1} + \sum_{\beta=1}^{N_{fn}}\bar{p}^{f,\beta,\nu+1}\Phi_{f,\beta}^h + \Phi^{h,\nu}\right) \quad \text{(Equation 16)}$$

and in continuous form reads $$-\nabla\cdot\left(K\lambda_t\cdot\nabla p\right)^{m,\nu+1} + \sum_{\beta=1}^{N_{fn}}\eta^{m,\beta}(p^m - \bar{p}^{f,\beta})^{\nu+1} = q_t^m + \sum_{\beta=1}^{N_{fn}}\eta^{m,\beta}\hat{p}^{f,\beta,\nu} \quad \text{(Equation 17)}$$

and $$\int_{A_\beta}\eta^{f,\beta}\left(p^{m,\nu+1} - \bar{p}^{f,\beta,\nu+1} - \hat{p}^{f,\beta,\nu}\right)dx = \int_{A_\beta}q_t^{f,\beta}dx \quad \text{(Equation 18)}$$

where basis functions ($\Phi_k^h$), fracture functions ($\Phi_{f,\beta}^h$) and correction functions ($\Phi^{h,\nu}$) are computed locally on dual coarse-scale grid cells ($\tilde{\Omega}^h$). Moreover, $\check{p}_k^{\nu+1}$ is the pressure at the new iteration level $\nu+1$ in the center of the k-th coarse grid cell ($\check{\Omega}^k$).

Figure 3:
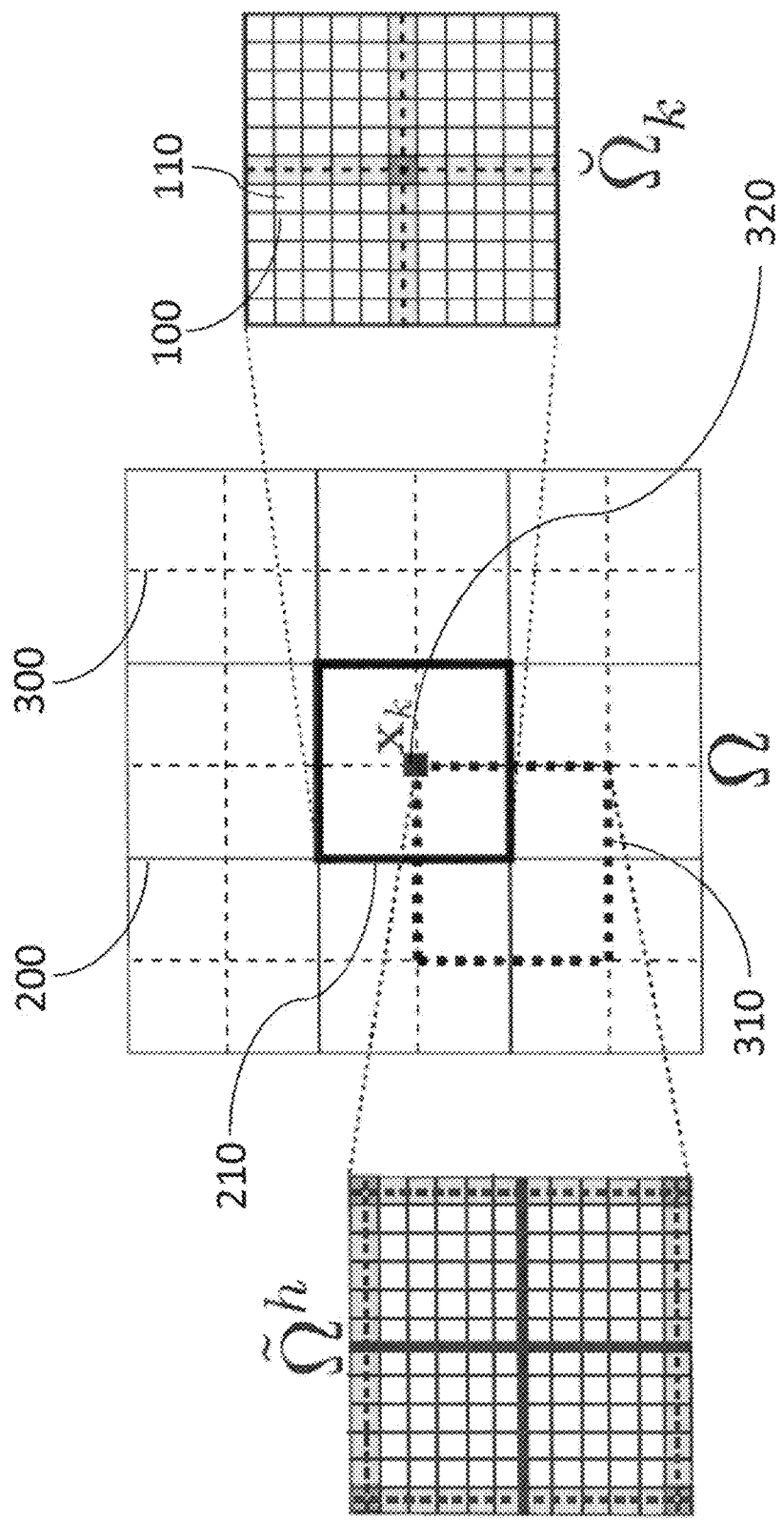
FIG. 3 is a schematic of a coarse grid and dual coarse grid overlaying a 2D fine grid, according to an embodiment of the present invention.

FIG. 3 depicts a grid system for MSFV and i-MSFV methods that includes a fine-scale grid 100, a conforming primal coarse-scale grid 200 shown in solid line, and a conforming dual coarse-scale grid 300 shown in dashed line. The fine-scale grid 100 is comprised of a plurality of fine cells 110. The primal coarse-scale grid 200 is comprised of a plurality of primal coarse cells 210 and is constructed on the fine-scale grid 100 such that each primal coarse cell 210 is comprised of multiple fine cells 110. The dual coarse-scale grid 300, which also conforms to the fine-scale grid 100, can be constructed such that each dual coarse control volume or cell 310 is comprised of multiple fine cells 110. There are $N_d$ dual coarse cells and $N_c$ coarse grid control volumes in the domain. Both the primal coarse cells 210 and dual coarse cells 310 contain 11×11 fine cells in the example of FIG. 3. An enlarged coarse cell is shown on the right side where the fine-scale boundary cells of the adjacent dual cells are depicted in gray. Each dual coarse cell 310 depicted in FIG. 3 is defined by nodes 320 of the dual coarse-scale grid 300. Also shown on the left in FIG. 3, is an enlarged dual coarse cell. In the enlarged figures, the fine-scale dual boundary cells are highlighted in gray.

As illustrated in FIG. 3, each primal coarse cell 210 contains exactly one node 320 in its interior. Generally, each node 320 is centrally located in each primal coarse cell 210. For example, the dual coarse-scale grid 300 can be constructed by connecting nodes 320 contained within adjacent primal coarse cells 210. One skilled in the art will appreciate that the primal coarse-scale and dual coarse-scale grids can be much coarser than the underlying fine grid 300 on which the mobility field is represented. It is also emphasized that the Multi-Scale Finite Volume method is not limited to the grids shown in FIG. 3, as very irregular grids or decompositions can be employed, as well as other sized grids such as coarse cells containing 5×5 or 7×7 fine cells.

Fractures are integrated into the MSFV framework by introducing local fracture functions ($\Phi_{f,\beta}^h$). This is analogous to how complex wells are managed in the MSFV framework and mathematically, the effect of fracture networks is similar to that of the rate constraint of complex wells with zero total production rates. When applying the iterative MSFV method, the basis functions ($\Phi_k^h$), fracture functions ($\Phi_{f,\gamma}^h$), and correction functions ($\Phi^{h,\nu}$) can be numerically computed by solving the following partial differential equations on local dual coarse-scale grid cells ($\tilde{\Omega}^h$):

$$-\nabla\cdot(K\lambda_t\cdot\nabla\Phi_k^h)^m + \sum_{\beta=1}^{N_{fn}}\eta^{m,\beta}\Phi_k^h = 0, \quad \text{(Equation 19)}$$

$$-\nabla\cdot(K\lambda_t\cdot\nabla\Phi_{f,\gamma}^h)^m + \sum_{\beta=1}^{N_{fn}}\eta^{m,\beta}(\Phi_{f,\gamma}^h - \delta_{\beta,\gamma}) = 0, \quad \text{(Equation 20)}$$

and $$-\nabla\cdot(K\lambda_t\cdot\nabla\Phi^{h,\nu})^m + \sum_{\beta=1}^{N_{fn}}\eta^{m,\beta}\Phi^{h,\nu} = q_t^m + \sum_{\beta=1}^{N_{fn}}\eta^{m,\beta}\hat{p}^{f,\beta,\nu}, \quad \text{(Equation 21)}$$

where $\delta_{\beta\gamma}$ is the Kronecker delta. Equation 19 is solved for overlapping coarse cells, $\forall~k \in \{1, \ldots, N_c\}|\Omega_\gamma^f\cap\tilde{\Omega}^h\neq\emptyset$. Similarly Equation 20 is solved for all overlapping fracture networks, $\forall~\gamma \in \{1, \ldots, N_{fn}\}|\Omega_\gamma^f\cap\tilde{\Omega}^h\neq\emptyset$. If the dual coarse cell $\tilde{\Omega}^h$ does not overlap with the primary coarse cell $\check{\Omega}_k$ ($\check{\Omega}_k\cap\tilde{\Omega}^h\neq\emptyset$), then $\Phi_k^h=0$. Also, if it does not overlap with the $\gamma$-th fracture network ($\Omega_\gamma^f\cap\tilde{\Omega}^h\neq\emptyset$), then $\Phi_{f,\gamma}^h=0$. Equations 19 and 20 are solved subject to reduced problem boundary conditions, while Equation 21 is solved using an iteratively improved boundary condition, i.e.

$$-(\nabla\cdot n^h)((K\lambda_t\cdot\nabla\Phi^{h,\nu})^m\cdot n^h)=--(\nabla\cdot n^h)((K\lambda_t\cdot\nabla p'_s{}^\nu)^m\cdot n^h), \quad \text{(Equation 22)}$$

where $p'_s{}^\nu$ is the matrix pressure field at the previous iteration level $\nu$, which can be smoothed (improved) using a classical global or local iterative scheme.

Figure 4:
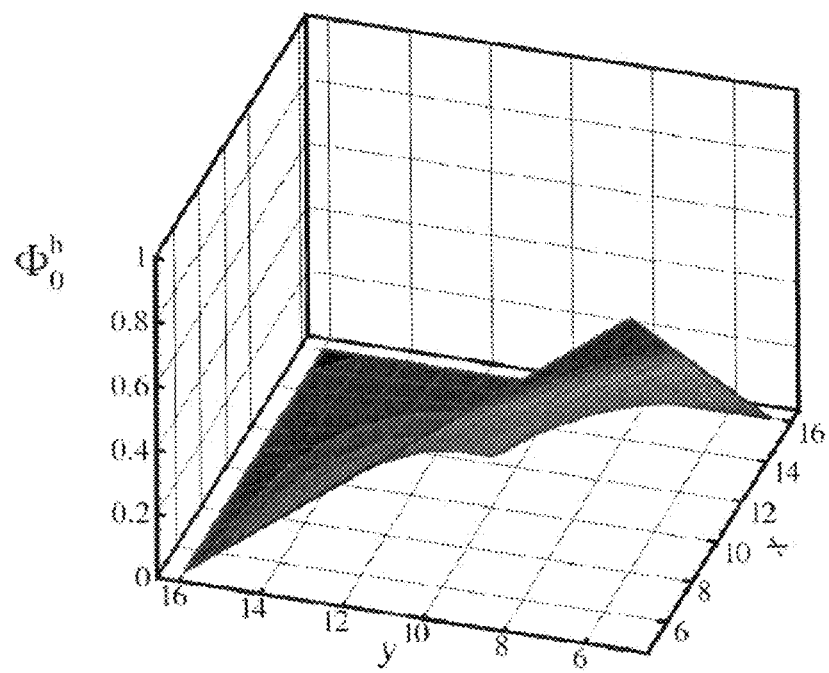
FIGS. 4A-4D are plots of basis functions on a 2D homogeneous dual coarse cell partially overlapped by a fracture line, according to embodiments of the present invention.
Figure 4:
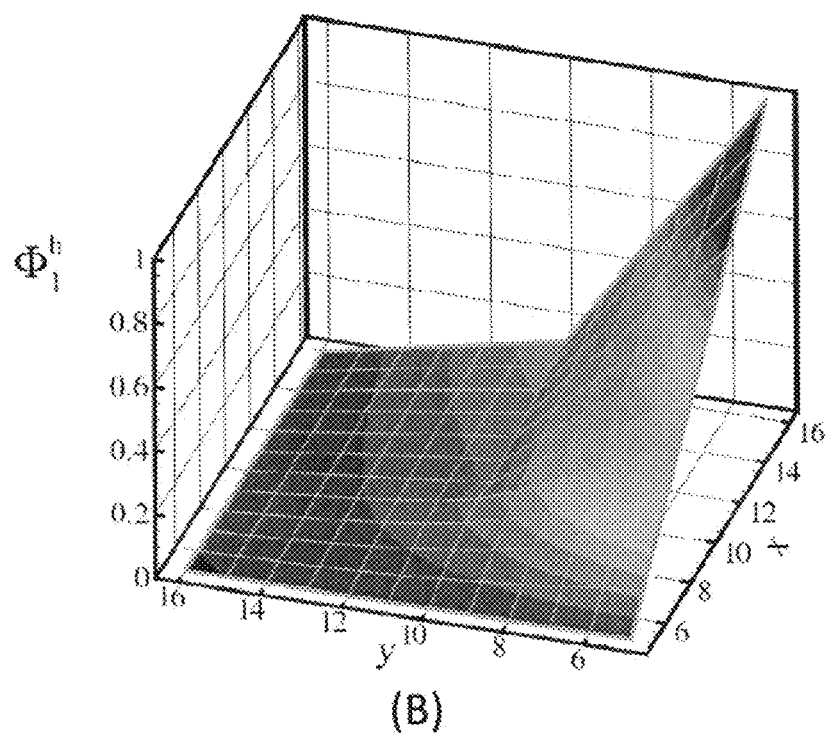
Figure 4:
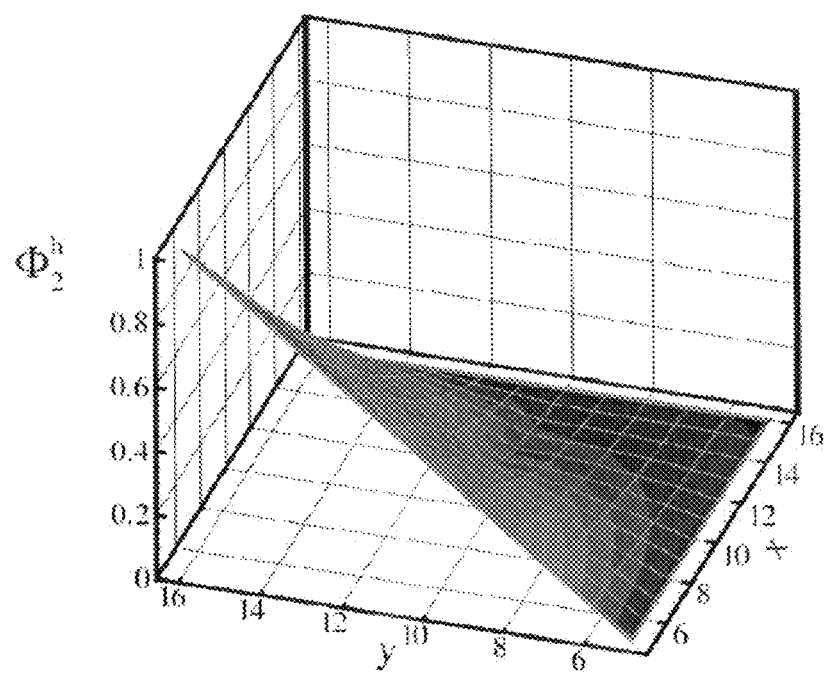
Figure 4:
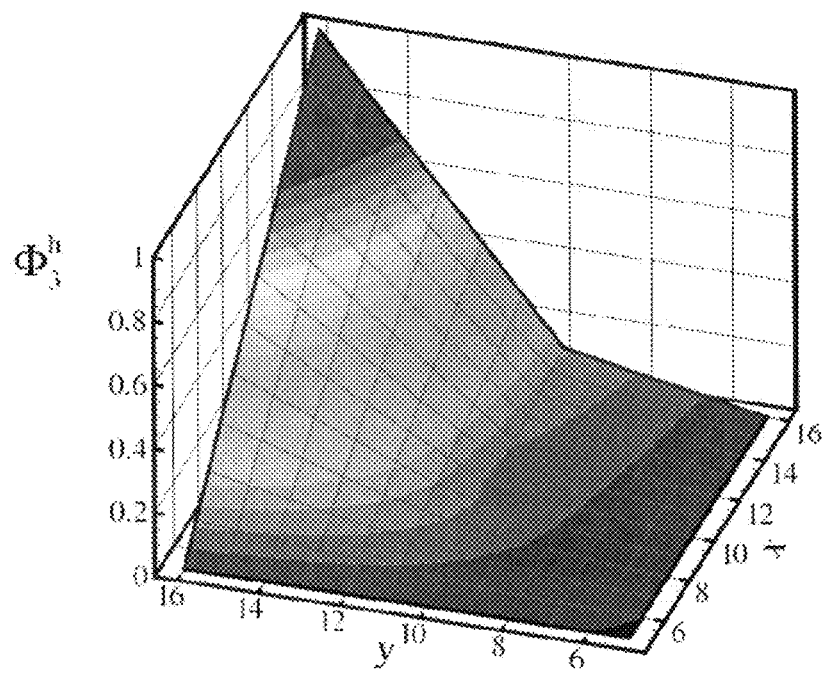
Figure 5:
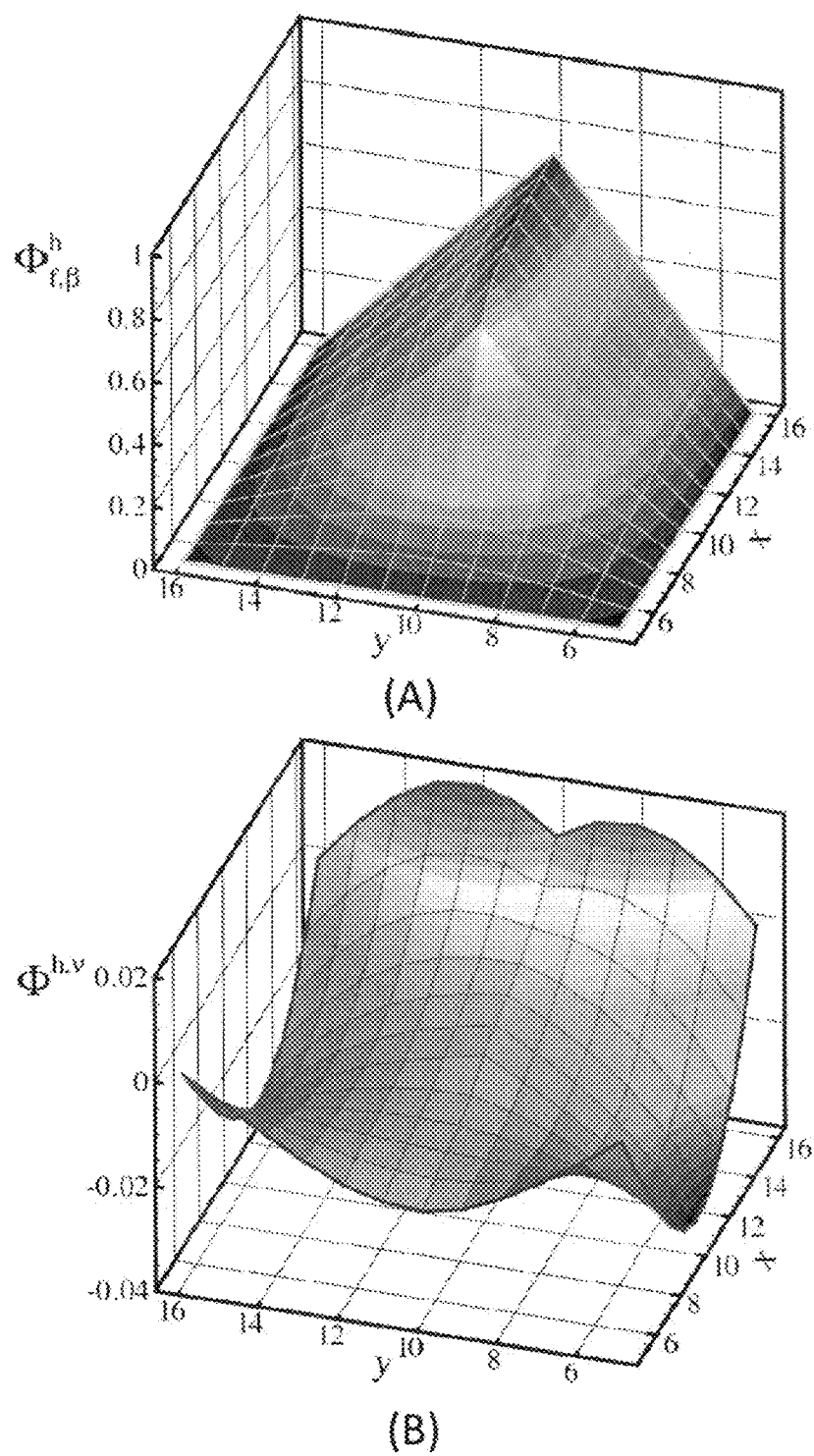
FIG. 5A shows plots of a fracture function.
FIG. 5B shows plots of a correction function.
FIG. 5C is a plot of the summation of the 4 basis functions shown in FIGS. 4A-4D.
FIG. 5D is a plot of the summation of the basis functions shown in FIGS. 4A-4D and the fracture function shown in FIG. 5A, according to an embodiment of the present invention.
Figure 5:
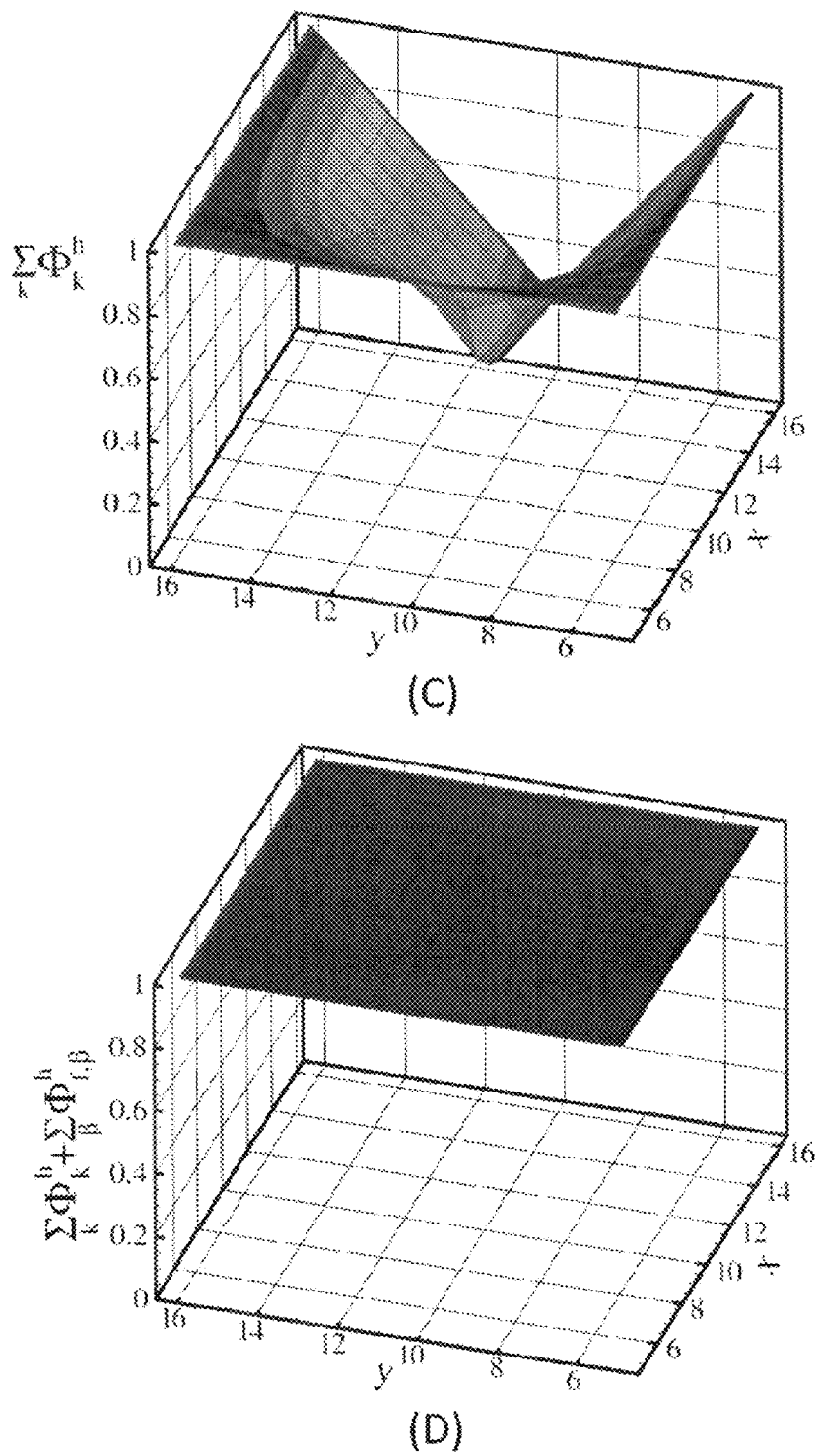

FIG. 4 is a plot of 4 basis functions (4A-4D) belonging to a 2D homogeneous dual coarse cell where a partially overlapping fracture line exists. FIG. 5 illustrates a fracture function (5A) and a correction function (5B) in 2D belonging to a homogeneous dual coarse cell with a partially overlapping fracture line. The correction function is plotted for $\nu>0$, where already an improved solution is used to enhance the localization condition. FIG. 5C is a plot of the summation of the 4 basis functions shown in FIGS. 4A-4D. FIG. 5D is a plot of the summation of the basis functions shown in FIGS. 4A-4D and the fracture function shown in FIG. 5A, which equals one. The number of fracture functions associated with a dual cell is equal to the number of disconnected fracture networks overlapping with that cell.

Figure 6:
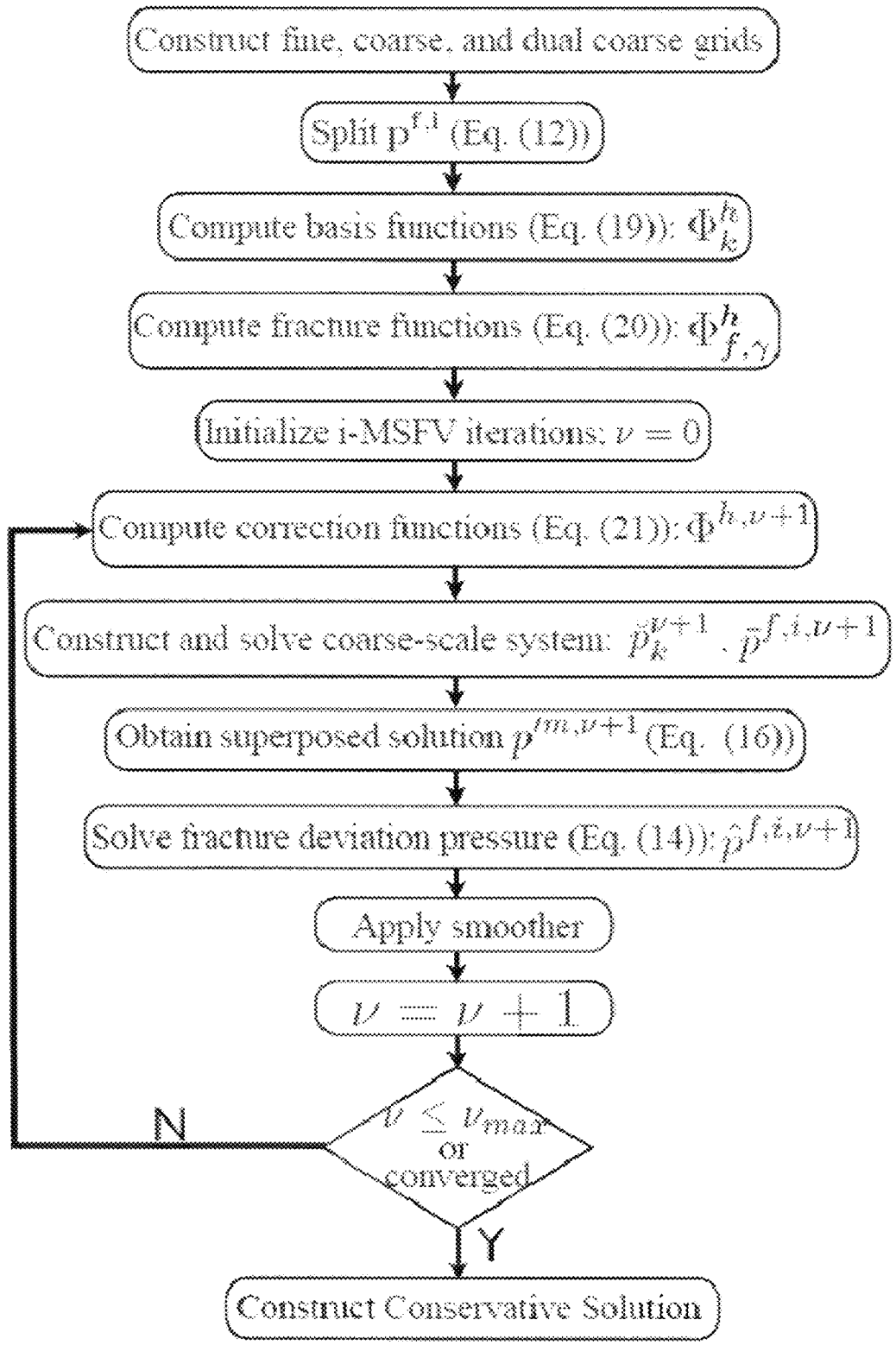
FIG. 6 shows a method for performing simulations of fluid flow in fractured porous media, according to an embodiment of the present invention.

Once the local functions are computed, the coarse-scale system can be obtained by first reformulating Equation 16 into Equations 17 and 18, and then integrating over coarse control volumes $\check{\Omega}_k$ (restriction step). This integration ensures that the coarse solution strictly conserves mass. Once the coarse solution is obtained, Equation 16 is again used (prolongation step) to find the fine-scale solution $p'^{m,\nu,+1}$. The smoother is then employed to obtain improved local boundary conditions for the correction functions at the next iteration level. These steps are repeated until a desired convergence criterion is satisfied. Here $\|\hat{p}^{f,v+1} - \hat{p}^{f,v}\|_\infty < \epsilon$ can be used as the convergence criterion, where $\epsilon$ is a specified parameter. If $\epsilon$ is chosen such that results are not fully converged to machine accuracy, an additional step, which is commonly called reconstruction of the conservative solution, can be employed in order to obtain a conservative fine-scale velocity field. FIG. 6 is a flowchart of i-MSFV method constructed for the hierarchical fracture method with sequential coupling.

Use of an Iterative Linear Solver to Reduce High Frequency Errors

As can be seen from Equation 22, the localization boundary conditions for the correction functions are iteratively improved using the fine-scale solution $p'^{m,v}_s$ from the previous iteration v, which is obtained by applying $n_s$ iterations of a consistent linear solver starting with $p'^{m,v}$. Moreover, the overall convergence rate of the sequential solution strategy is improved by also updating the fine-scale fracture pressure values by the iterative solver (smoother). Generally the smoothed (not converged) solution obtained by such an iterative fine-scale solver is not conservative, which would have a negative impact on the convergence rate. Therefore, after each iteration an additional step is preformed to ensure correct total flux balance for each fracture network.

In one embodiment, a line-relaxation (LR) method is used to smooth the matrix pressure field. The smoothing procedure can be summarized as follows:

1. A line-relaxation iteration is applied on the matrix pressure $p^m$ (resulting in $p_s^m$), whereas $\bar{p}^f$ is treated explicitly on the right-hand-side (RHS).
2. The reference pressures $\bar{p}^f$ in each fracture network are adjusted such that total mass balance, i.e. Eq. (18), is honored. More precisely, $\bar{p}^f$ is updated using Eq. (18) with smoothed pressure $p_s^m$ and deviation terms $\hat{p}^f$ are treated explicitly.
3. The fluctuating pressure values $\hat{p}^f$ are improved either with a direct solver (for small fracture network systems) or iteratively, for example, by a few LR iterations.
4. Steps 1 through 3 are repeated $n_s$ times.

Line-relaxation is only one possible option for reducing high frequency errors in the MSFV solution and one skilled in the art will appreciate that other methods can be applied to achieve convergence. For example, Krylov sub-space methods, such as Generalized Minimal Residual (GMRES), Flexible Generalized Minimal Residual (FGMRES), Orthogonal Minimization (ORTHOMIN), Bi-Conjugate Gradient Stabilized (Bi-CGSTAB), or Generalized Conjugate Residual (GCR), can also be used to stabilize the system.

Those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed or parallel computing environments where tasks are performed by servers or other processing devices that are linked through one or more data communications networks. For example, the large computational problems arising in reservoir simulation can be broken down into smaller ones such that they can be solved concurrently—or in parallel. In particular, the system can include a cluster of several stand-alone computers. Each stand-alone computer can comprise a single core or multiple core microprocessors that are networked through a hub and switch to a controller computer and network server. An optimal number of individual processors can then be selected for a given problem based on factors such as reservoir partitioning where the reservoir grid cells are divided into domains that are assigned to the individual processors.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore, are not to be considered limiting of its scope and breadth.

Figure 7:
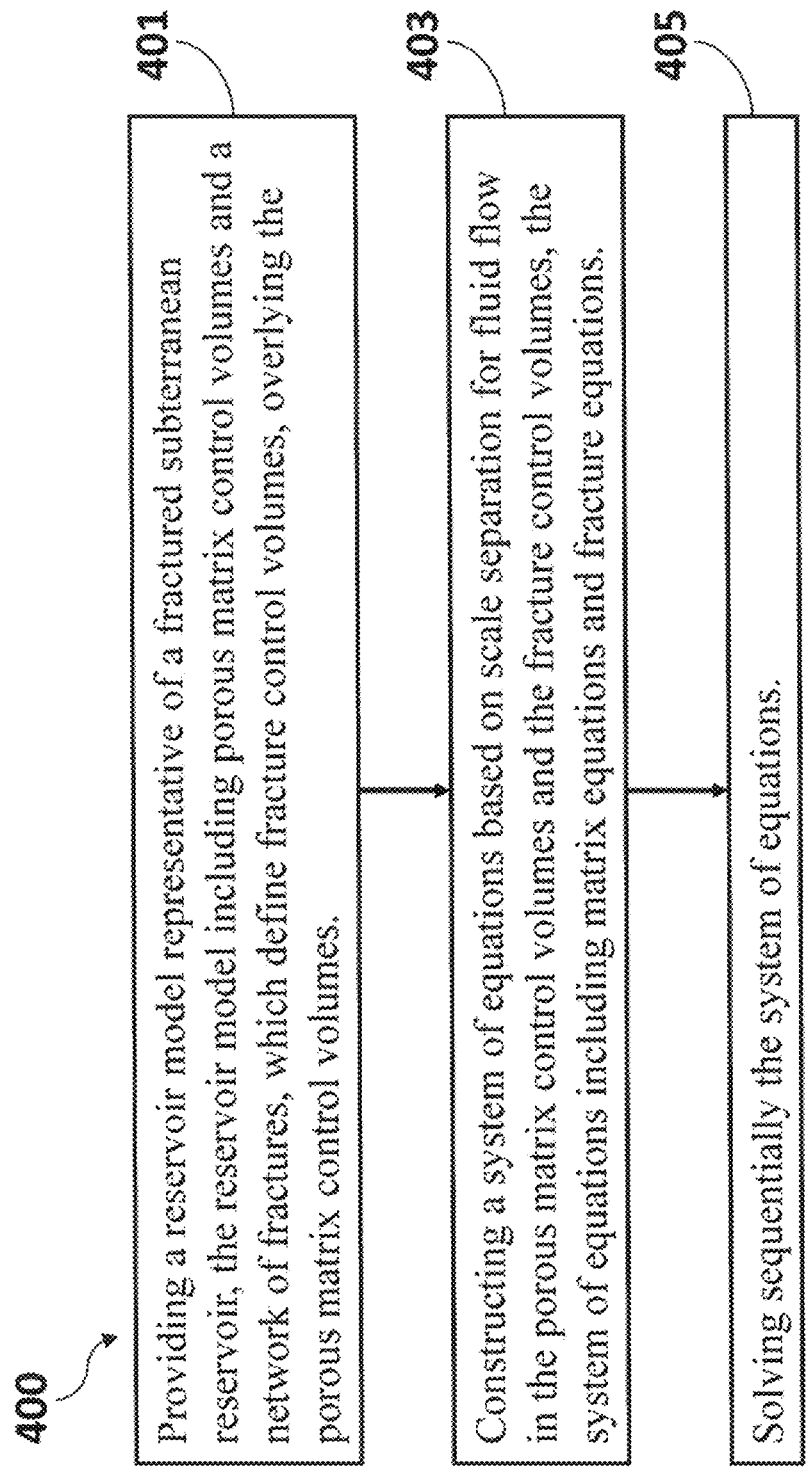
FIG. 7 shows a method for performing simulations of fluid flow in fractured porous media, according to an embodiment of the present invention.

FIG. 7 depicts a flow diagram of an example computer-implemented method 400 for use in simulating fluid flow in a fractured subterranean reservoir. A reservoir model representative of a fractured subterranean reservoir is provided in step 401. The reservoir model includes porous matrix control volumes and a network of fractures, which define fracture control volumes, overlying the porous matrix control volumes. In step 403, a hierarchical fracture method based on scale separation is obtained for fluid flow in the porous matrix control volumes and the fracture control volumes. For example, a system of equations representing the hierarchical fracture method based on scale separation can comprise matrix equations and fracture equations coupled via flux interactions between the matrix control volumes and the fracture control volumes. According to embodiments of the present invention, the fracture equations can include a pressure vector for each network of fractures that is split into an average pressure value $\bar{p}^{f,i}$ and remainder pressure value $\hat{p}^{f,i}$. In step 405, the system of equations representing the hierarchical fracture method based on scale separation is solved sequentially. In some embodiments, an iterative Multi-Scale Finite Volume method is used to obtain the solution in step 405. For example, a pressure field can be approximated for fluids on a coarse-scale grid according to the following equation:

$$p^{m,v+1} \approx p'^{m,v+1} = \sum_{h=1}^{N_d} \left( \sum_{k=1}^{N_c} \Phi_k^h \bar{p}_k^{v+1} + \sum_{\beta=1}^{N_{fn}} \bar{p}^{f,\beta,v+1} \Phi_{f,\beta}^h \Phi^{h,v} \right)$$

where $\Phi_k^h$ represents basis functions, $\Phi_{f,\beta}^h$ represents fracture functions, and $\Phi^{h,v}$ represents correction functions. Other fluid flow characteristics can also be computed, on either the fine or coarse-scale, in step 405 including velocity fields, saturations, temperatures, and production flow rates and amounts. In some embodiments, the solution or result of the computation obtained in step 405 is transformed into image representations that are displayed or output to the operator.

Figure 8:
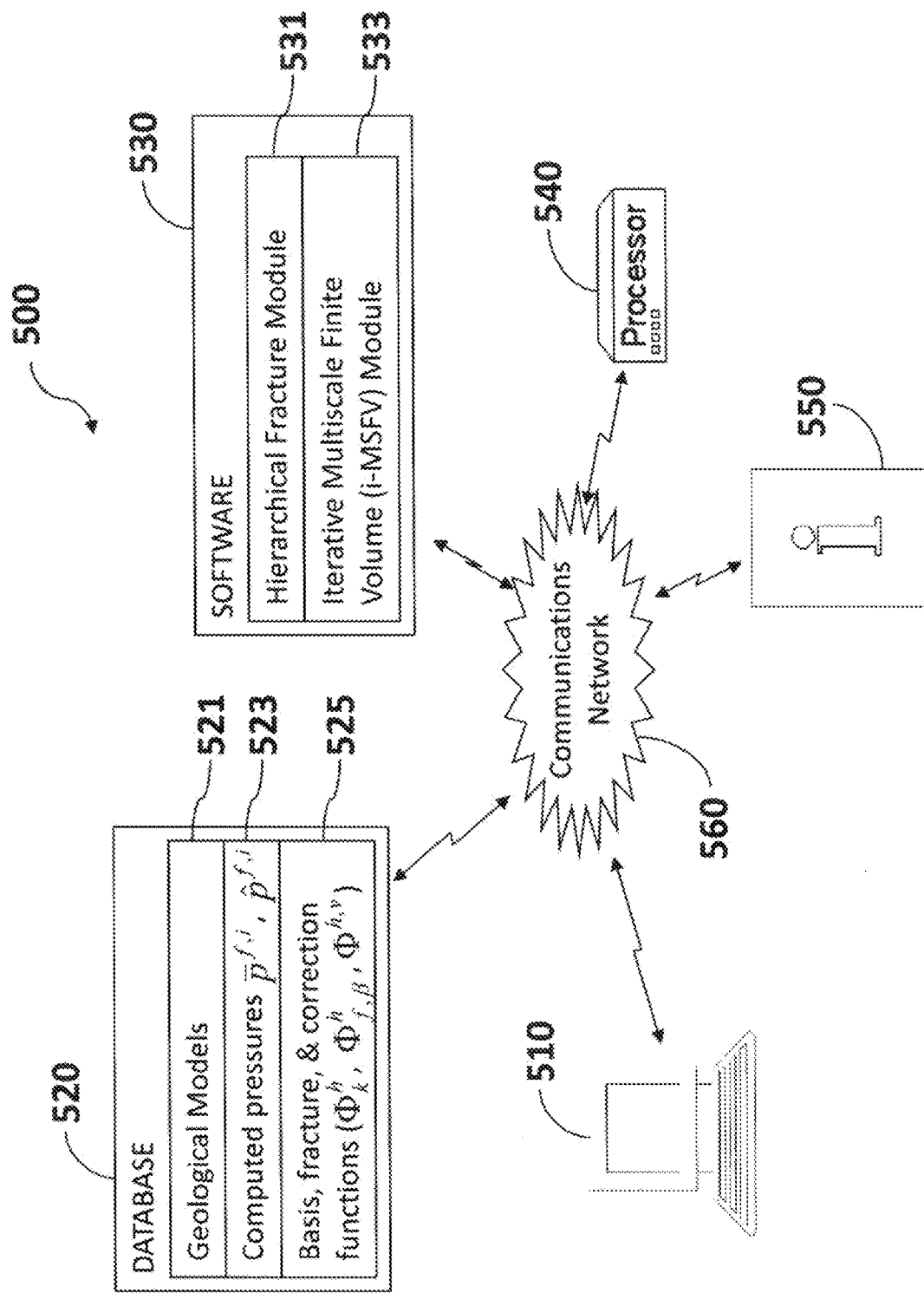
FIG. 8 shows a system for performing simulations of fluid flow in fractured porous media, according to an embodiment of the present invention.

FIG. 8 illustrates an example computer system 500 for performing simulations of fluid flow in fractured porous media, such as by using the methods as described herein, including the methods shown in FIGS. 6 and 7. System 500 includes user interface 510, such that an operator can actively input information and review operations of system 500. User interface 510 can be any means in which a person is capable of interacting with system 500 such as a keyboard, mouse, or touch-screen display. In some embodiments, user interface 510 embodies spatial computing technologies, which typically rely on multiple core processors, parallel programming, and cloud services to produce a virtual world in which hand gestures and voice commands are used to manage system inputs and outputs.

Operator-entered data input into system 500 through user interface 510, can be stored in database 520. Additionally, any information generated by system 500 can also be stored in database 520. For example, database 520 can store user-defined parameters, as well as, system generated computed solutions. Accordingly, geological models 521, computed pressure solutions 523, and basis functions, fracture functions, and correction functions 525, are all examples of information that can be stored in database 520.

System 500 includes software or computer program 530 that is stored on a non-transitory computer usable or processor readable medium. Current examples of such non-transitory processor readable medium include, but are not limited to, read-only memory (ROM) devices, random access memory (RAM) devices and semiconductor-based memory devices. This includes flash memory devices, programmable ROM (PROM) devices, erasable programmable ROM (EPROM) devices, electrically erasable programmable ROM (EEPROM) devices, dynamic RAM (DRAM) devices, static RAM (SRAM) devices, magnetic storage devices (e.g., floppy disks, hard disks), optical disks (e.g., compact disks (CD-ROMs)), and integrated circuits. Non-transitory medium can be transportable such that the one or more computer programs (i.e., a plurality of instructions) stored thereon can be loaded onto a computer resource such that when executed on the one or more computers or processors, performs the aforementioned functions of the various embodiments of the present invention.

Computer system 500 includes one or more modules and/or is in communication with one or more devices configured to perform any step of any of the methods described herein, including the methods shown in FIGS. 6 and 7. Processor 540 interprets instructions or program code encoded on the non-transitory medium to execute computer program 530, as well as, generates automatic instructions to execute computer program 530 for system 500 responsive to predetermined conditions. Instructions from both user interface 510 and computer program 530 are processed by processor 540 for operation of system 500. In some embodiments, a plurality of processors 540 is utilized such that system operations can be executed more rapidly.

Examples of modules for computer program 530 include, but are not limited to, Hierarchical Fracture Module 531 and Iterative Multi-Scale Finite Volume (i-MSFV) Module 533. Hierarchical Fracture Module 531 is capable of constructing a system of equations, including matrix equations and fracture equations, based on scale separation that is representative of fluid flow in a reservoir. Iterative Multi-Scale Finite Volume (i-MSFV) Module 533 is capable of computing flux interactions, connectivity indexes, pressure solutions 523, and basis functions, fracture functions, and correction functions 525. In some embodiments, Iterative Multi-Scale Finite Volume (i-MSFV) Module 533 computes velocity and/or saturations maps from the pressure solutions 523.

In certain embodiments, system 500 includes reporting unit 550 to provide information to the operator or to other systems (not shown). For example, reporting unit 550 can be a printer, display screen, or a data storage device. However, it should be understood that system 500 need not include reporting unit 550, and alternatively user interface 510 can be utilized for reporting information of system 500 to the operator.

Communication between any components of system 500, such as user interface 510, database 520, computer program 530, processor 540 and reporting unit 550, can be transferred over communications network 560. Computer system 500 can be linked or connected to other, remote computer systems (e.g., linear solvers) via communications network 560. Communications network 560 can be any means that allows for information transfer to facilitate sharing of knowledge and resources, and can utilize any communications protocol such as the Transmission Control Protocol/Internet Protocol (TCP/IP). Examples of communications network 560 include, but are not limited to, personal area networks (PANS), local area networks (LANs), wide area networks (WANs), campus area networks (CANS), and virtual private networks (VPNs). Communications network 560 can also include any hardware technology or equipment used to connect individual devices in the network, such as by wired technologies (e.g., twisted pair cables, co-axial cables, optical cables) or wireless technologies (e.g., radio waves).

In operation, an operator initiates software 530, through user interface 510, to perform the methods described herein, such as the methods shown in FIGS. 6 and 7. Outputs from each software module, such as Hierarchical Fracture Module 531 and Iterative Multi-Scale Finite Volume (i-MSFV) Module 533, can be stored in database 520. Software 530 utilizes Hierarchical Fracture Module 531 to construct a system of equations based on scale separation, which comprise matrix equations and fracture equations. The fracture equations can include a pressure vector for each network of fractures that is split into an average pressure value $\bar{p}^{f,i}$ and a remainder pressure value $\hat{p}^{f,i}$. Iterative Multi-Scale Finite Volume (i-MSFV) Module 533 can sequentially solve the system of equations based on scale separation to compute solutions, such as pressure solutions 523. Iterative Multi-Scale Finite Volume (i-MSFV) Module 533 can further compute flux interactions, connectivity indexes, basis functions, fracture functions, and correction functions 525 to obtain pressure solutions 523. In some embodiments, Iterative Multi-Scale Finite Volume (i-MSFV) Module 533 computes a conservative velocity field from the pressure solutions 523. For example, Multi-Scale Finite Volume (i-MSFV) Module 533 can be a linear solver used to solve the linear system of equations and can be used in both serial and parallel versions of a reservoir simulator. The computation can be performed on a system of grids (e.g., a fine grid, a coarse grid, and a dual coarse grid) as discussed in herein.

A visual display can be produced, such as through reporting unit 550 or user interface 510, using output from system 500. For example, system 500 can output information related to pressure solutions 523, which can be transformed into image data representations for display to a user or operator. For example, pressure distributions, velocity fields, saturation maps, or other fluid flow characteristic within the reservoir can be displayed. The displayed information can be utilized to forecast or optimize the production performance of the subterranean reservoir, which can then be used for reservoir management decisions.

NUMERICAL EXAMPLES

As will be described, the results obtained using the aforementioned hierarchical fracture modeling method based on scale separation and those obtained using a fine-scale hierarchical fractured reservoir simulator are very similar. Furthermore, the performance of the hierarchical fracture modeling method based on scale separation when paired with an i-MSFV solver is advantageous. For all example cases below, isotropic permeabilities ($K^m = k^m I$ and $K^f = k^f I$) are used.

Figure 9:
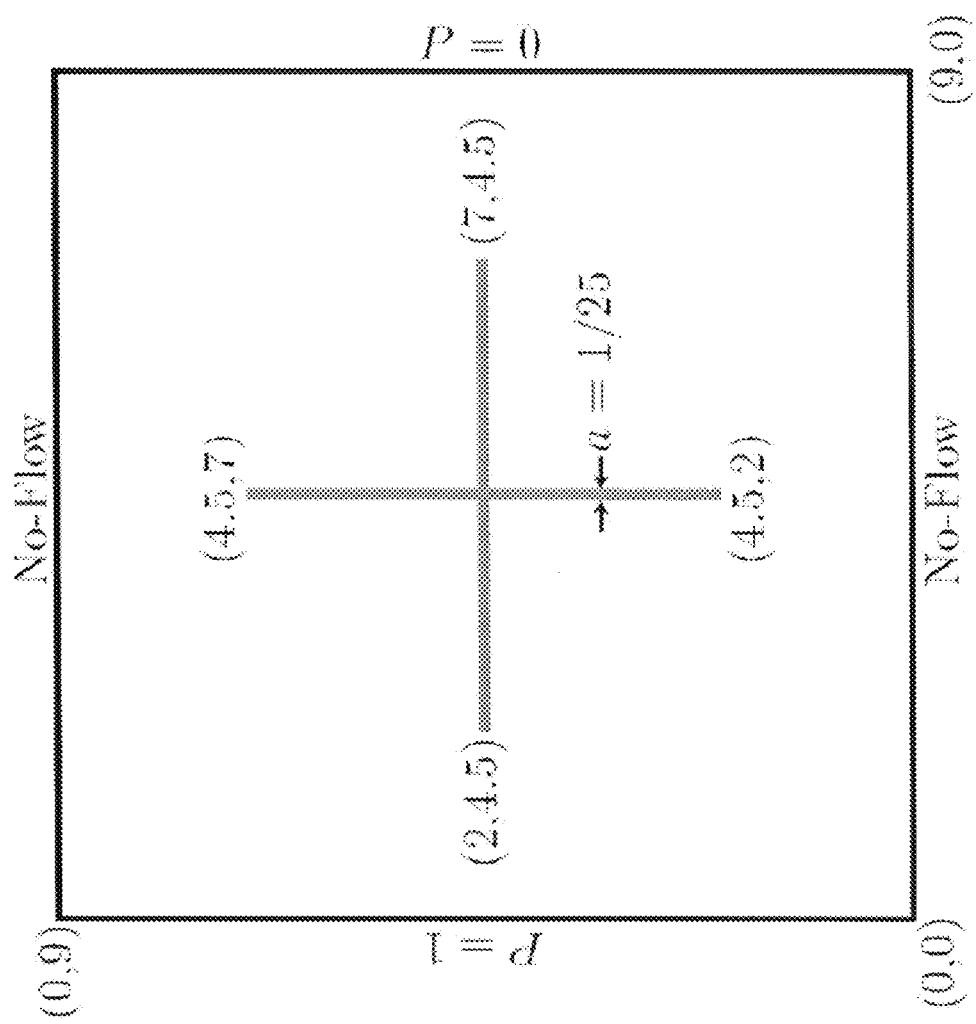
FIG. 9 shows a fractured 2D homogeneous matrix domain, according to an embodiment of the present invention.

FIG. 9 shows a "+"-shaped fracture network with $k^*=k^f/k^m=10^5$ located at the center of the quadratic L×L homogeneous 2D domain: No-flow boundary conditions are applied at the top and bottom, while the pressure values are set to p=1 and p=0 at the left and right boundaries, respectively. The hierarchical fracture modeling approach based on scale separation is compared with a simulation in which the fractures are resolved by a very fine grid. According to the length scales specified in FIG. 9, the fractures with aperture α=L/225 are fully resolved by using 225×225 grid cells (fully resolved simulation). For the simulation with the hierarchical approach, a 27×27 matrix grid and 32 fracture segments are used.

Figure 10:
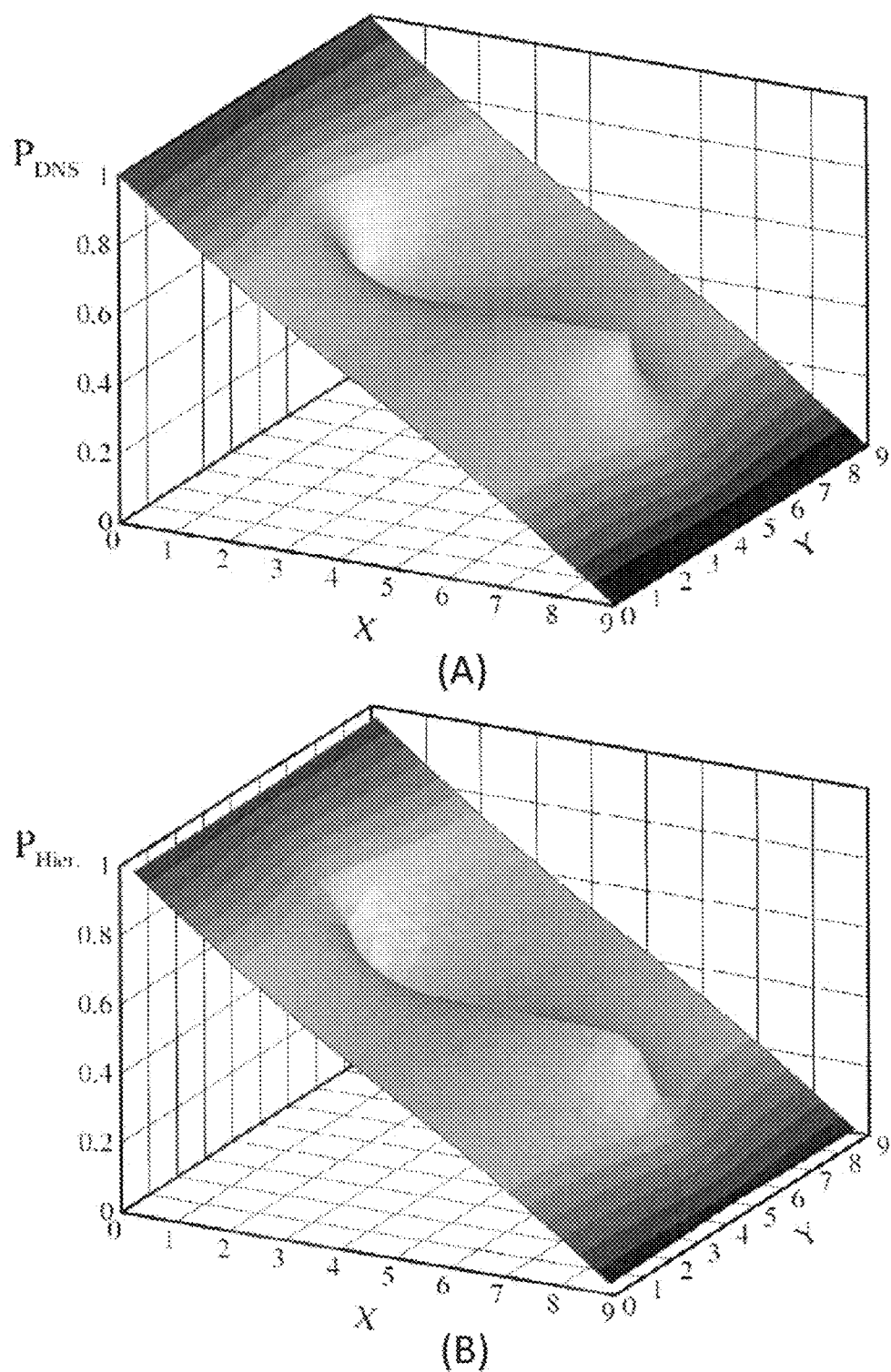
FIG. 10 shows pressure maps obtained by an Algebraic Multi-Grid (AMG) solver using a classical tightly coupled hierarchical fracture model (10A) and obtained by an i-MSFV solver sequentially solving a system of equations based on scale separation (10B), according to an embodiment of the present invention.

FIG. 10 illustrates the solutions (i.e., pressure maps) from the fully resolved simulation and the hierarchical approach for the example case shown in FIG. 9. In this case, the role of the vertical fracture is less important than that of the horizontal fracture. Compared to the fully resolved fine-scale solution, the total flow rate in the hierarchical fracture modeling framework matches well and is only under-predicted by 1.6 percent.

Figure 11:
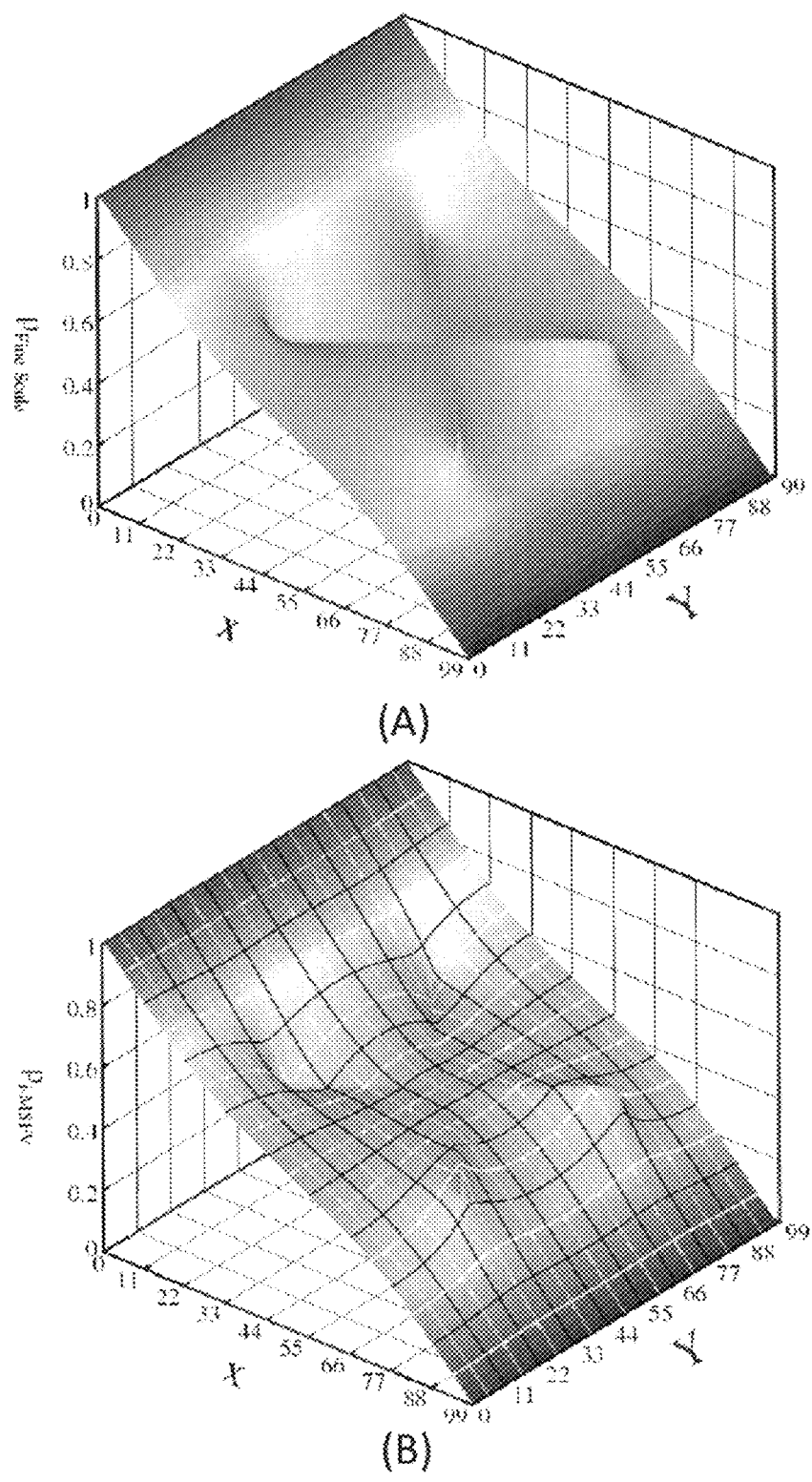
FIG. 11 shows pressure maps obtained by an AMG solver using a classical tightly coupled hierarchical fracture model (11A) and obtained by an i-MSFV solver sequentially solving a system of equations based on scale separation (11B), according to an embodiment of the present invention.

FIG. 11 illustrates pressure maps for another example case in which art iterative MSFV method is used for simulating the hierarchical fracture model based on scale separation. This example case has an "X"-shaped fracture network with $k^*=10^3$ at the center of a 2D domain. The 2D domain and boundary conditions are the same as that shown in FIG. 9. In particular, the dimensionless pressure at the left and right boundaries is set to 1 and 0, respectively, while at the top and bottom boundaries no-flow conditions are applied. The results of the iterative MSFV method are compared with that obtained by a classical tightly coupled hierarchical fracture model using a 99×99 equidistant Cartesian grid ($\Delta x^m=\Delta y^m=1$ m) for the matrix at the fine-scale (misaligned with the fractures). For the i-MSFV method, a 9×9 equidistant coarse grid is used. Both the coarse grid and dual coarse grid are shown on the i-MSFV result map in FIG. 11B. In both simulations, the fractures consist of 141 equidistance fracture segments ($\Delta x^f=1.01$ m). The i-MSFV method is applied only for the matrix equation and no grid alignment is necessary. The solution of the i-MSFV framework for the fractured reservoir is fully converged to machine accuracy in $n_s=4$ iterations. The pressure map of the i-MSFV framework for the fractured reservoir (FIG. 11B) is within machine accuracy of the pressure map obtained using the fully coupled hierarchical fine-scale model (FIG. 11A).

The convergence history of the i-MSFV method for fractured porous media is also tested for a wide range of example cases. Moreover, the efficiency of the method is studied for multiphase flow in heterogeneous and homogeneous fractured porous media. Numerical results below show that the i-MSFV method is a flexible iterative method which is efficient for multiphase simulations in highly heterogeneous fractured porous media.

Figure 12:
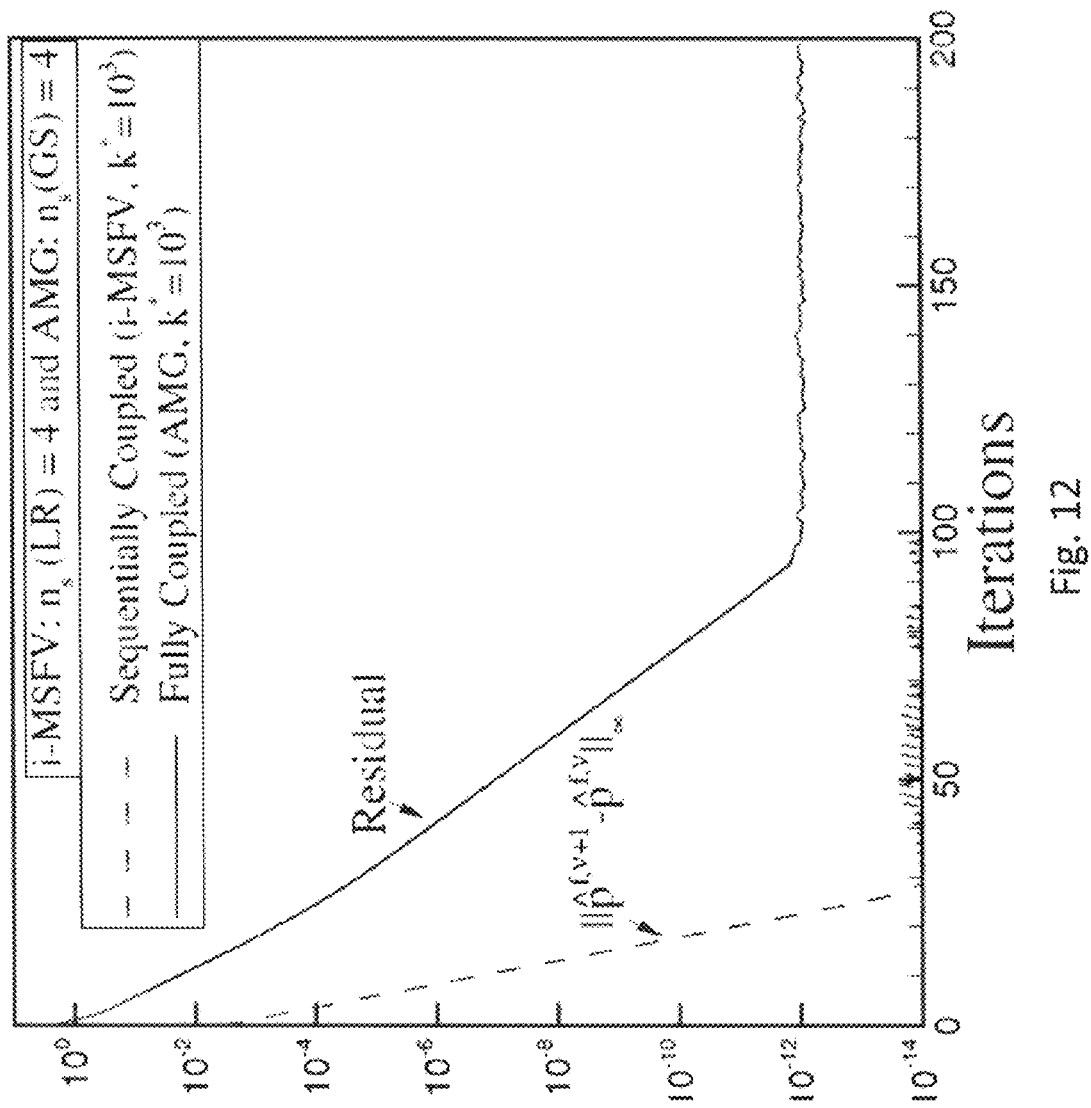
FIG. 12 shows convergence histories of simulations for the AMG solver and the i-MSFV solver for obtaining the solutions shown in FIG. 11, according to an embodiment of the present invention.
Figure 13:
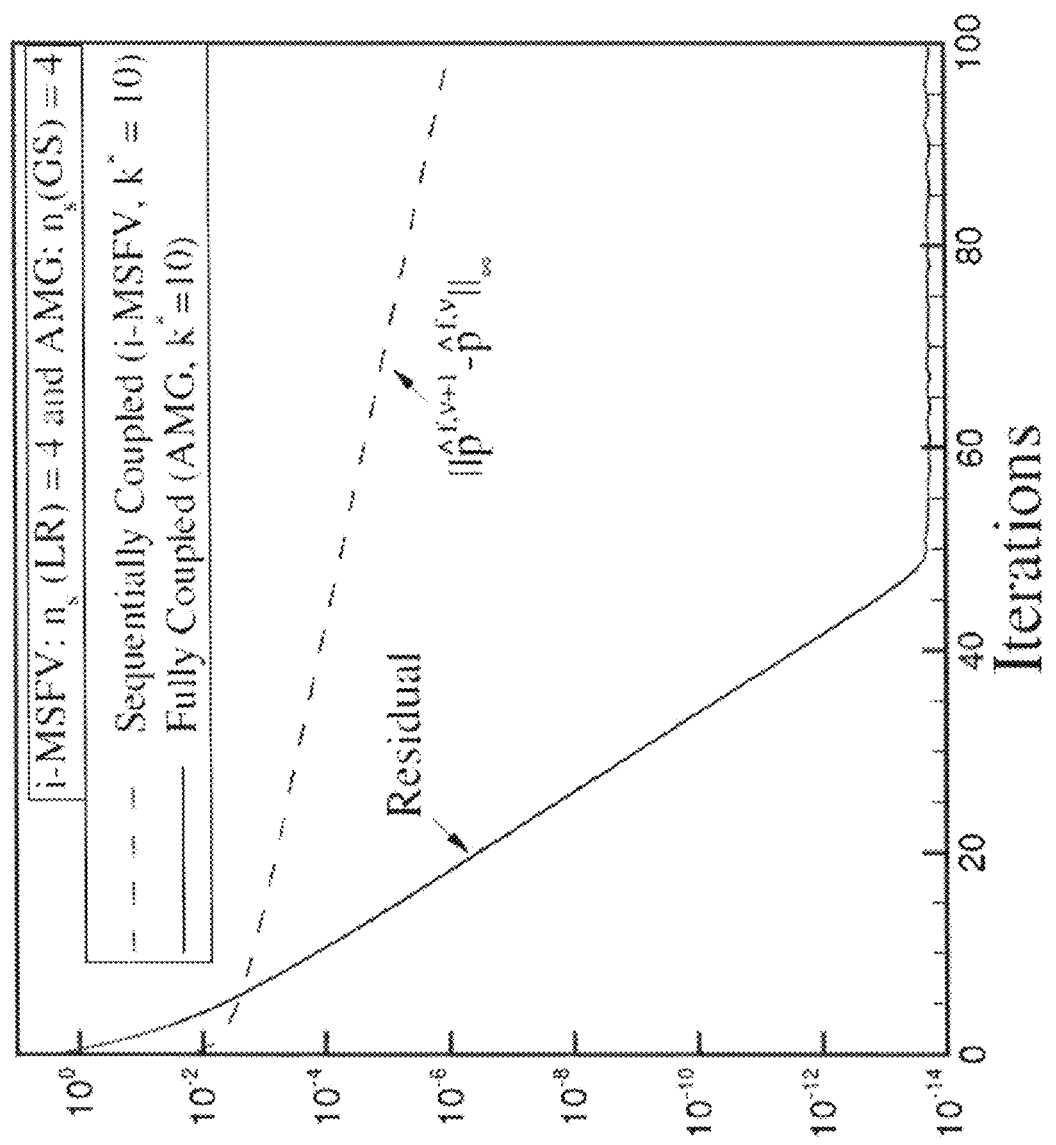
FIG. 13 shows convergence histories of simulations for the AMG solver and the i-MSFV solver for obtaining the solutions for a homogeneous fractured domain, according to an embodiment of the present invention.

FIGS. 12 and 13 compare convergence histories for homogeneous example cases obtained using an Algebraic Multi-Grid (AMG) solver applied to a tightly coupled fine-scale system and obtained using an i-MSFV solver using the sequential strategy for fractured porous media. The convergence histories shown in FIG. 12 correspond to the results of FIGS. 11A and 11B where $k^*=10^3$. FIG. 13 shows convergence histories where $k^*=10$. The sequential strategy used by the i-MSFV method for fractured porous media results in much smaller global systems. For the tightly coupled system, the residual with respect to the full system is plotted versus the number of AMG iterations. For the i-MSFV solver, $\|\hat{p}^{f,v+1}-\hat{p}^{f,v}\|_\infty$ is plotted versus the number of outer iterations over the matrix and fracture equations. Line Relaxation (LR) and Gauss-Seidel (GS) smoothers are applied by the i-MSFV and AMG, respectively. A conservative fine-scale velocity field can be constructed after any iteration level for the i-MSFV solutions. Therefore, one can apply a few iterations to improve the MSFV results and solve the transport problem. This is not possible if a classical iterative linear solver, such as Algebraic Multi-Grid, is used as only the fully converged solution is conservative.

Figure 14:
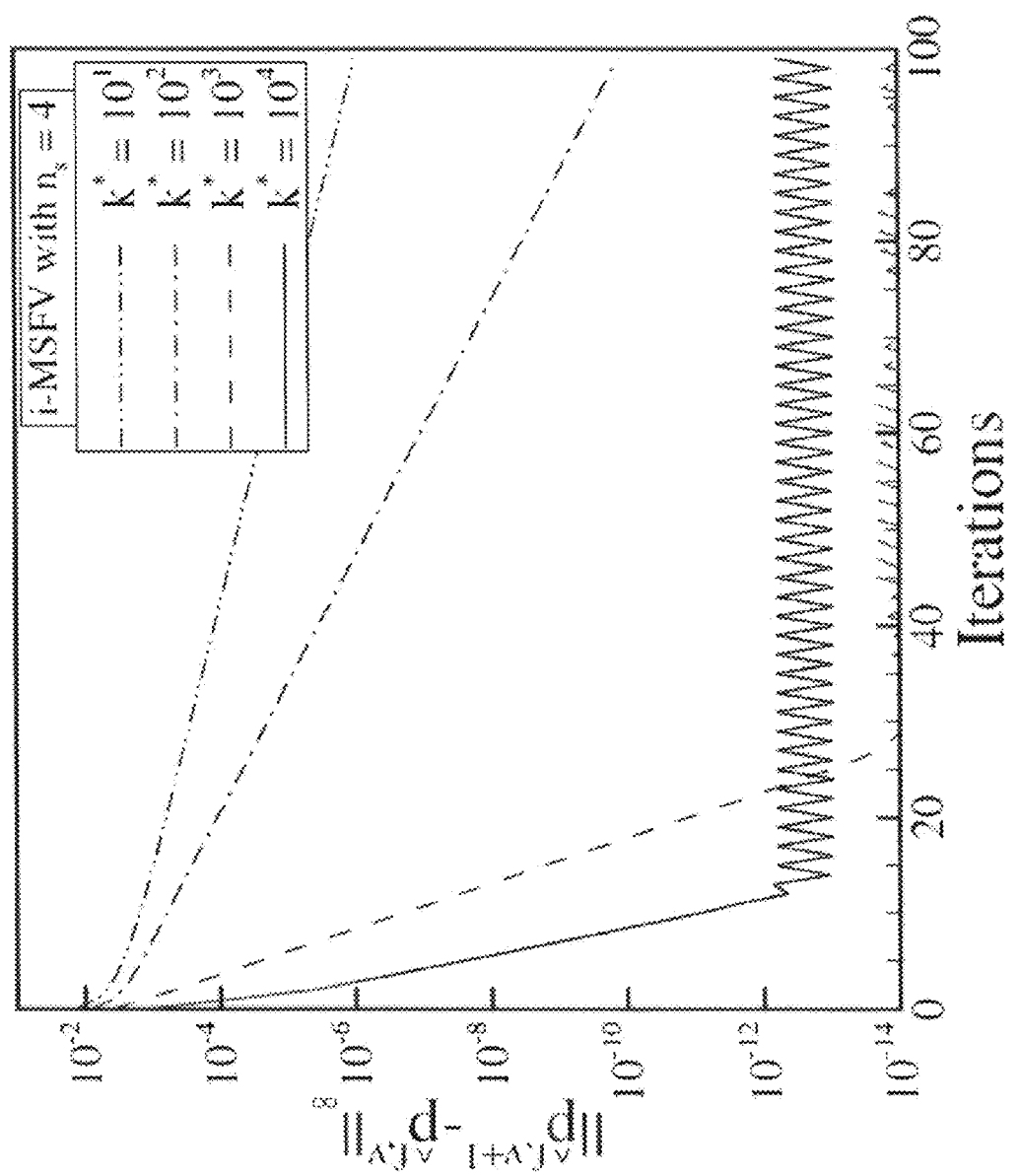
FIG. 14, shows convergence histories of simulations for the i-MSFV solver for obtaining the solutions for a homogeneous fractured domain with various fracture and matrix permeability ratios, according to an embodiment of the present invention.

FIG. 14 shows convergence histories of the i-MSFV method for a homogeneous example case with various k* values, which clearly demonstrates that the convergence rate of the sequential strategy decreases as the conductivity of the fractures is reduced. The lower the fracture conductivity, the higher the pressure gradient. Hence, the remainder $\hat{p}^f$ of the fracture pressure, which is updated sequentially, becomes more important and more outer iterations are required to achieve convergence. The i-MSFV method is very efficient for highly conductive fractures because the representation of individual fracture networks is by single average (coarse-scale) pressure values.

Figure 15:
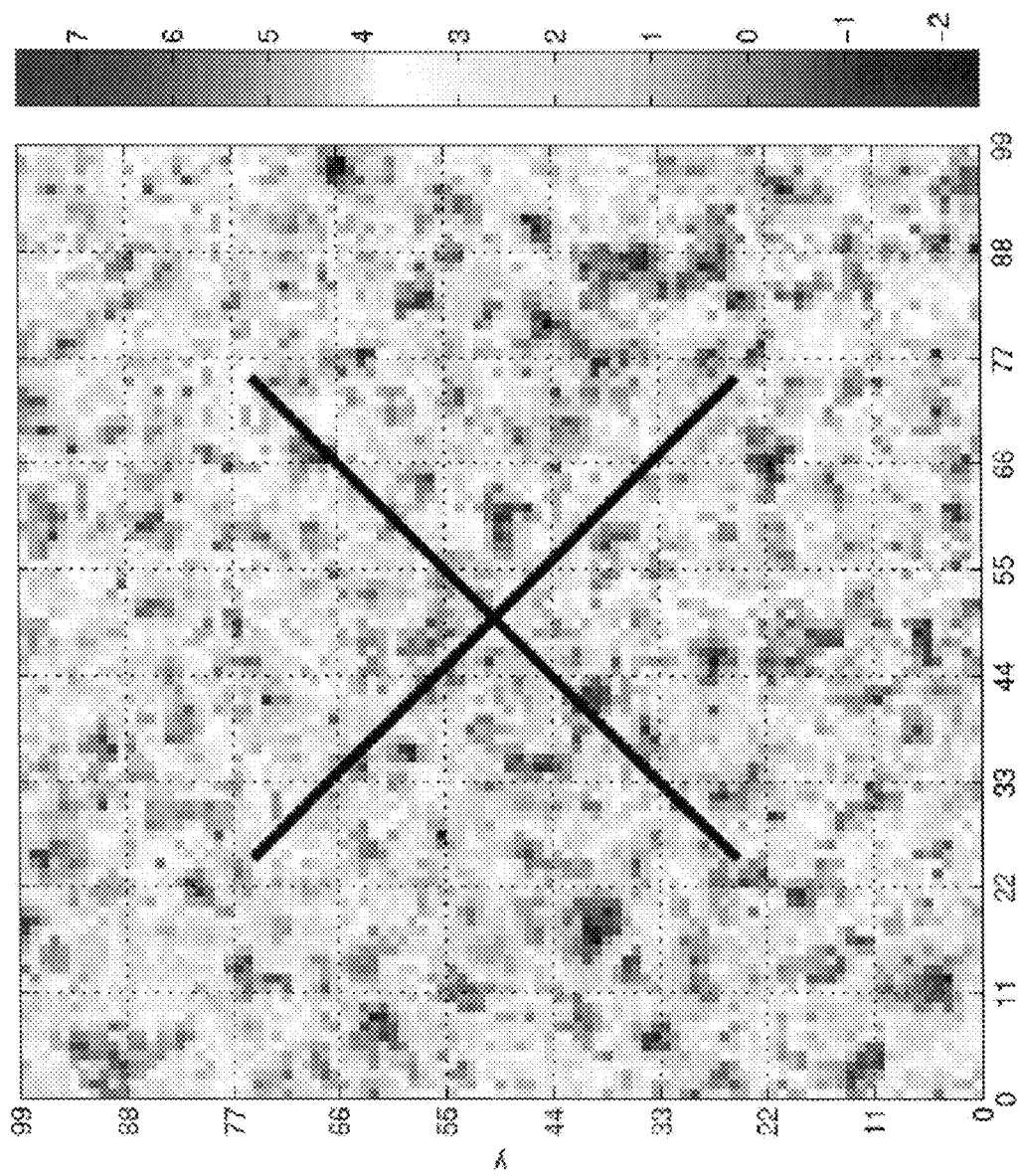
FIG. 15 shows a natural-log, permeability distribution of a fractured 2D heterogeneous matrix domain, according to an embodiment of the present invention.
Figure 16:
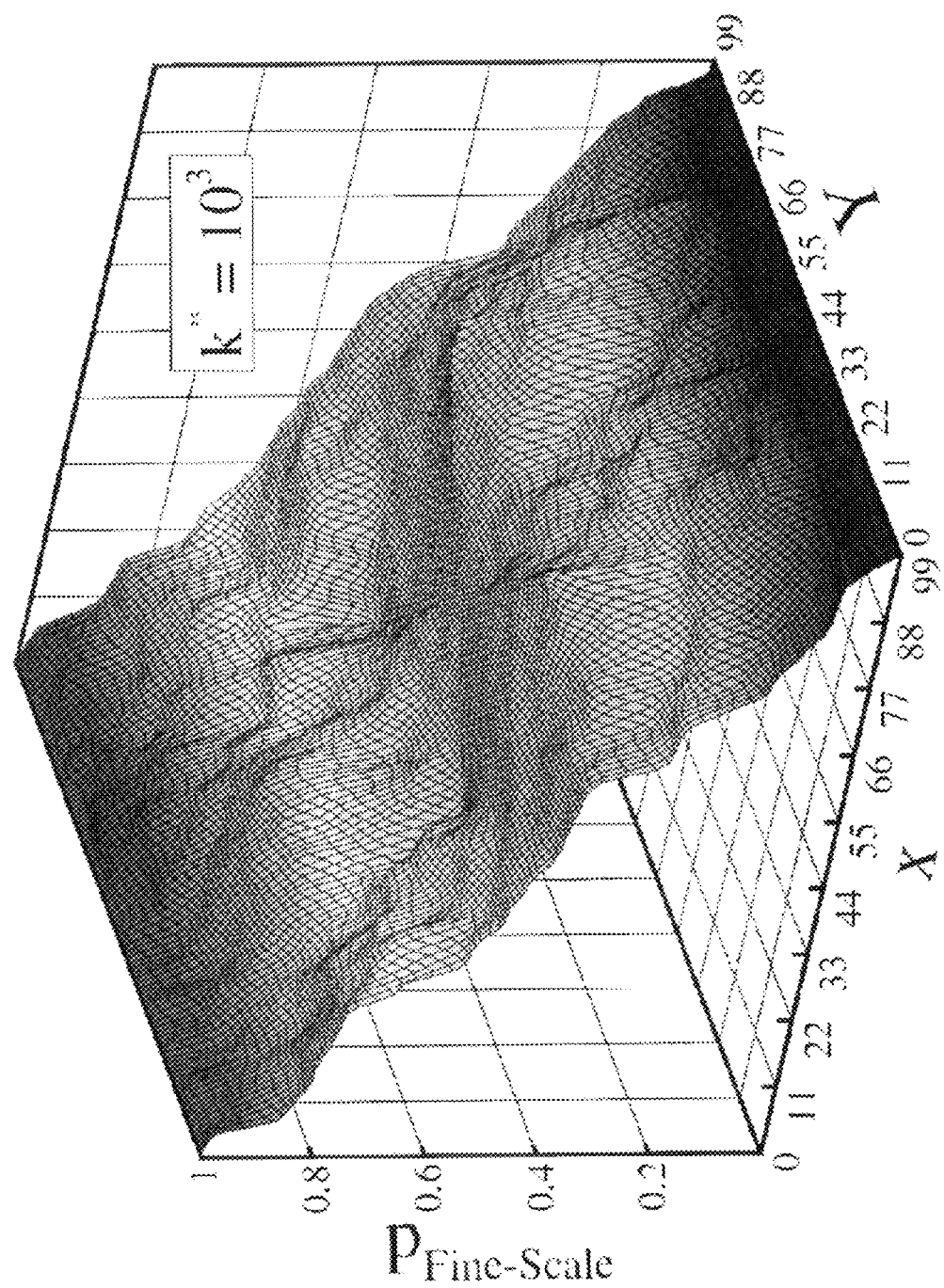
FIG. 16 shows a pressure map of the fractured 2D heterogeneous matrix domain shown in FIG. 15, according to an embodiment of the present invention.
Figure 17:
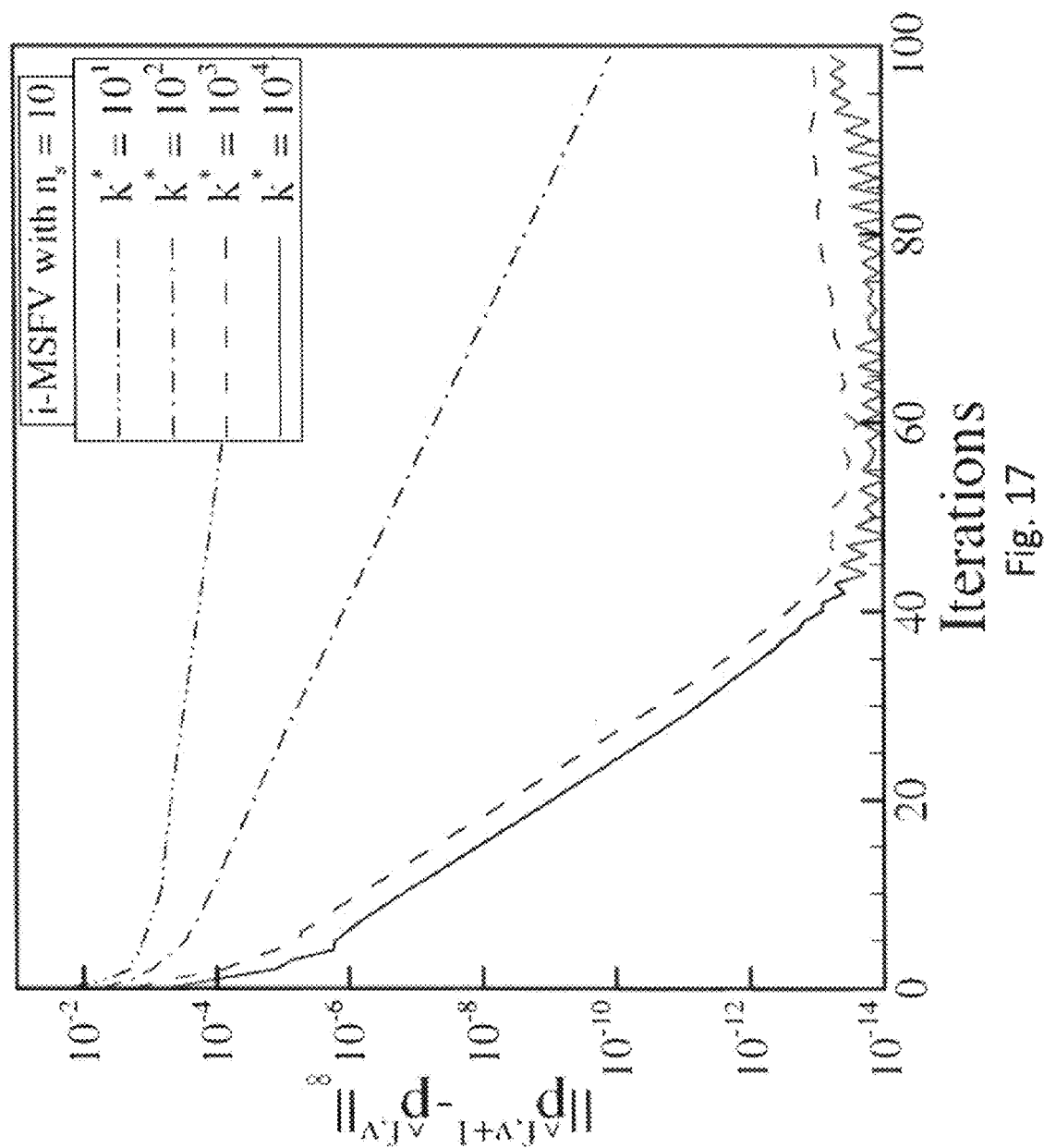
FIG. 17 shows convergence histories of simulations for the i-MSFV solver for the fractured 2D heterogeneous matrix domain shown in FIG. 15 with various fracture and matrix permeability ratios, according to an embodiment of the present invention.

FIG. 15 shows a natural-log, permeability distribution of a 2D heterogeneous matrix domain, which is used to further investigate the fracture conductivity on the convergence history of the i-MSFV solver when paired with the hierarchical fracture modeling method based on scale separation. The X-shaped fracture network is located in the domain center. The problem geometry, boundary conditions and coarsening factor are all the same as in the previous example. The solution for $k^*=k^f/\overline{k}^m=10^3$, where $\overline{k}^m$ is the average matrix permeablity, is shown in FIG. 16. Convergence histories for i-MSFV simulations in fractured porous media for with different k* values are depicted in FIG. 17.

Figure 18:
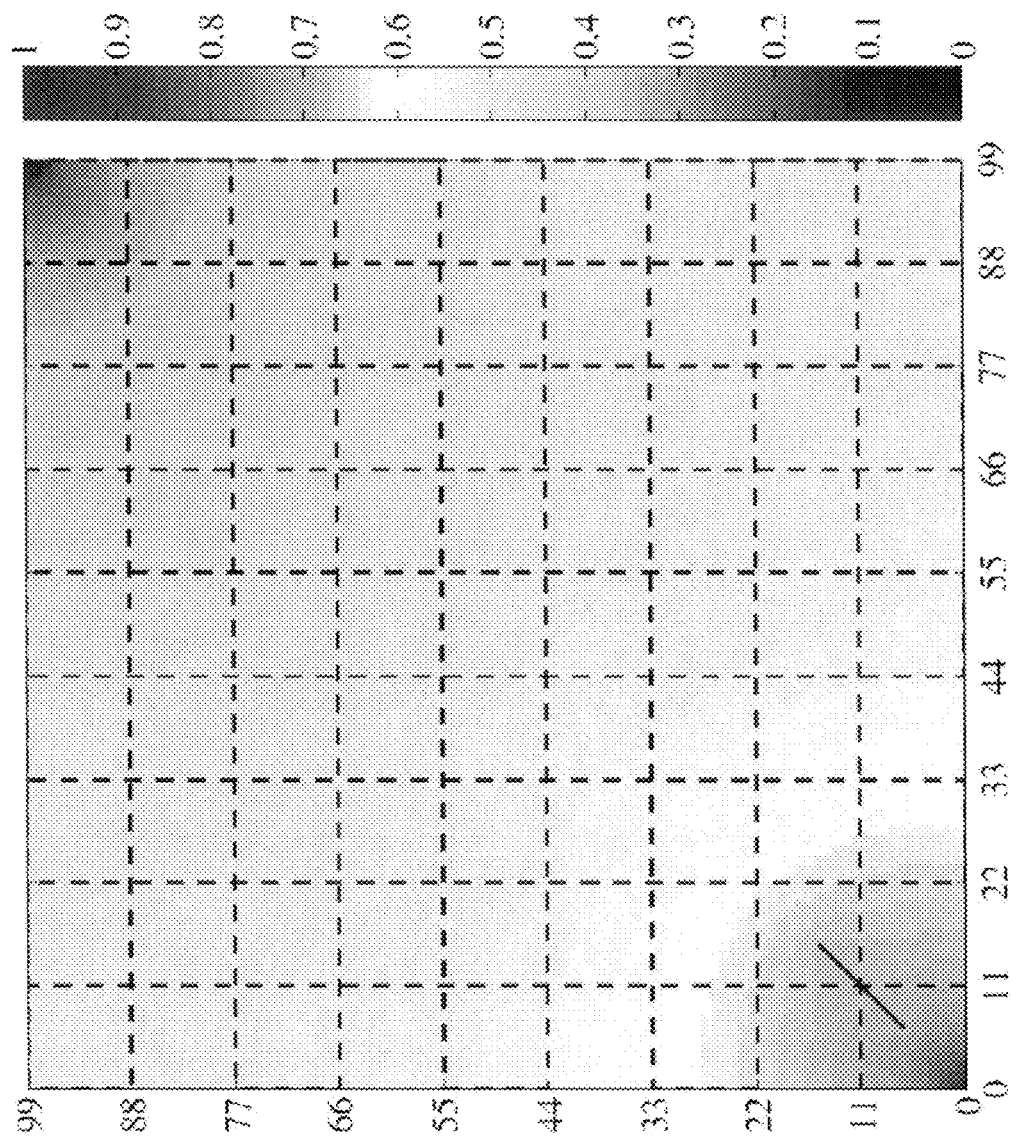
FIG. 18 shows a pressure map of the fractured homogeneous permeability field, according to an embodiment of the present invention.
Figure 19:
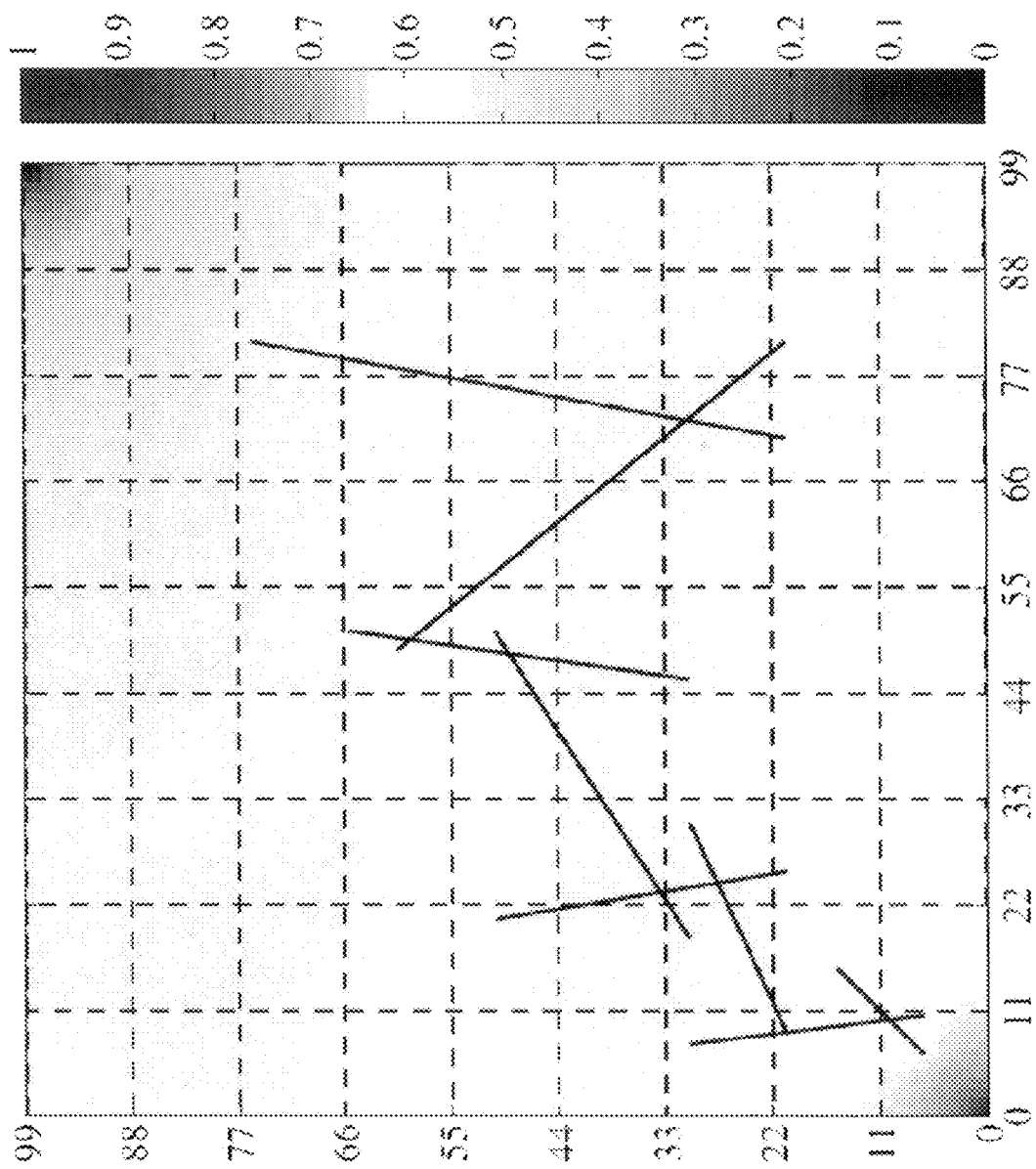
FIG. 19 shows a pressure map of the fractured homogeneous permeability field shown in FIG. 18 with a larger fracture network, according to an embodiment of the present invention.

Considering one of the advantages of the hierarchical fracture modeling approach based on scale separation is the minimal fracture/matrix grid dependencies, the performance of the i-MSFV method is tested in a homogeneous permeability field. No-flow conditions are applied on the whole domain boundary. Similar to the previous example cases, fine and coarse grids consist of 99×99 and 9×9 grid cells, respectively. The dimensionless pressure values in cells (1,1) and (99,99) are set to 1 and 0, respectively. In contrast to the previous example cases, the fracture network is generated in 8 phases. Phase 1 consists of only one fracture line, as shown in FIG. 18. During each phase, one fracture line is added to the network; hence the network becomes bigger from one phase to the next. The locations of the fracture lines are arbitrary selected. All 8 fracture lines are shown in FIG. 19. For each phase, the initial pressure value is set to zero. Therefore, each phase is treated like a new example case with a new fracture network such that no preconditioning based on the solution of the previous phase is employed. The matrix grid is the same during all phases and fracture transmissibility is set at $10^3$ times more conductive than the matrix transmissibility.

Figure 20:
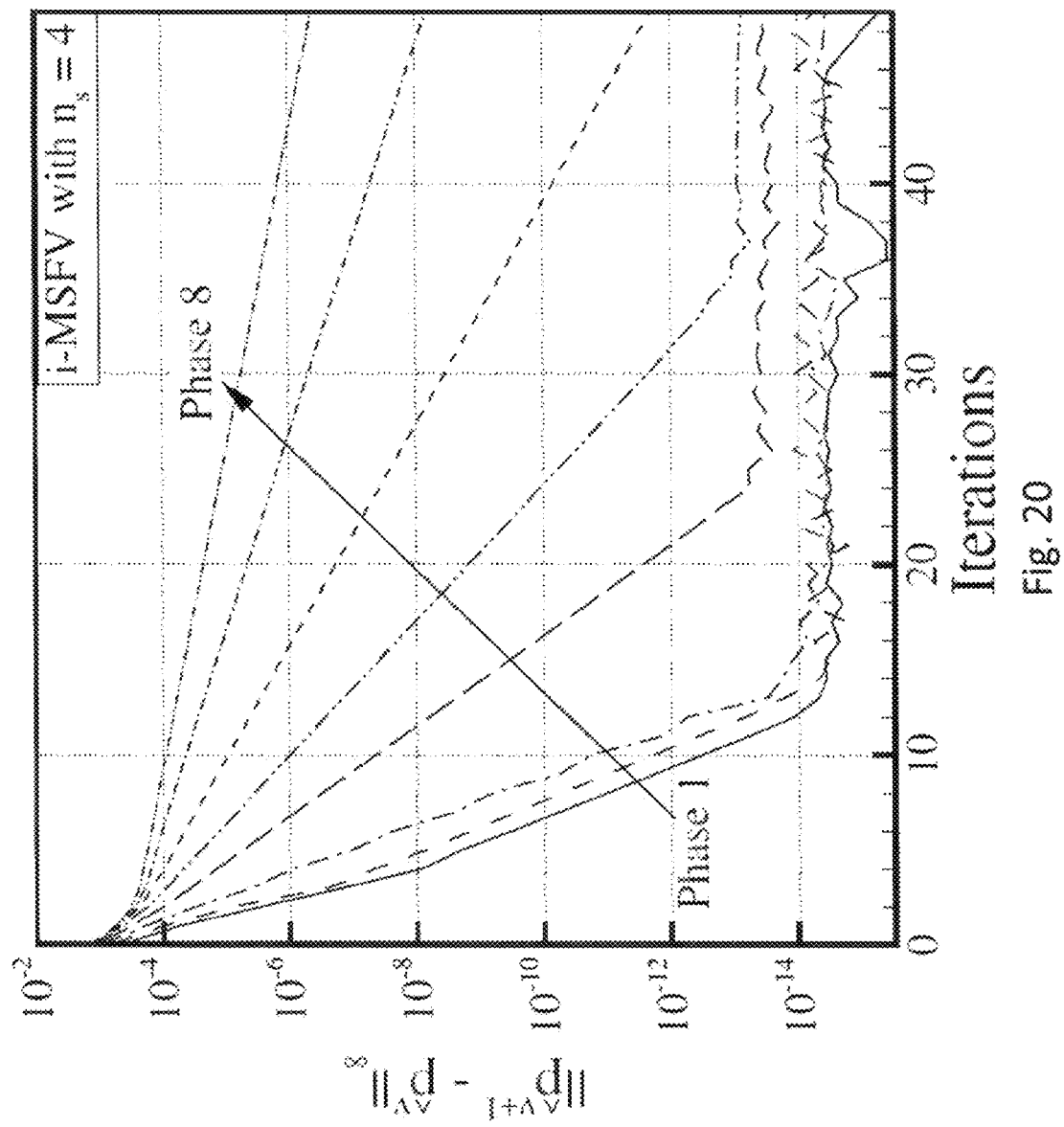
FIG. 20 shows convergence histories of simulations for the i-MSFV solver for the fractured homogeneous permeability field shown in FIG. 18 as the fracture network is dynamically increased, according to an embodiment of the present invention.

FIG. 20 illustrates the convergence histories of the i-MSFV method obtained with $n_s=4$ for each of the 8 phases. As the fracture network grows and gets closer to the production location, the pressure variation inside the fracture network becomes larger and therefore, more iterations are required to achieve convergence.

Figure 21:
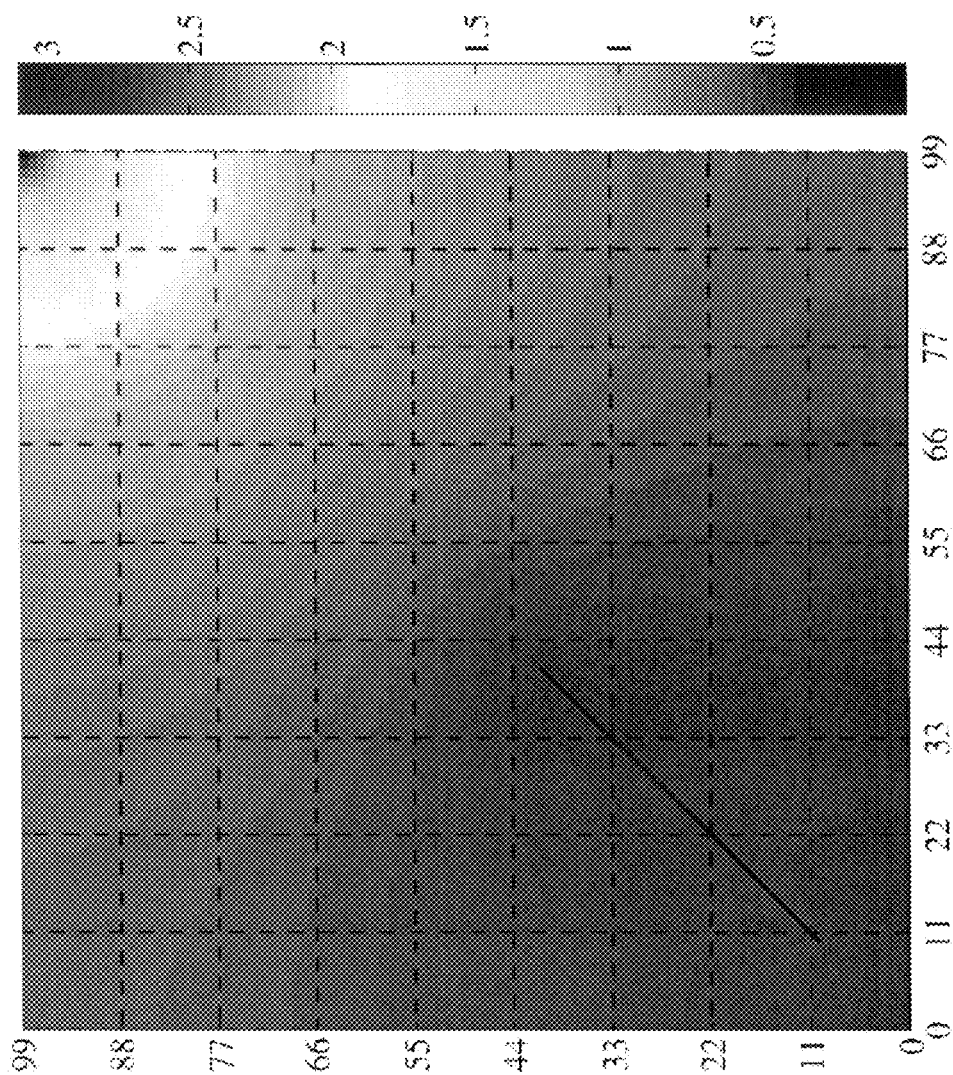
FIG. 21 shows a pressure map of for two phase flow in a fractured homogeneous domain, according to an embodiment of the present invention.
Figure 22:
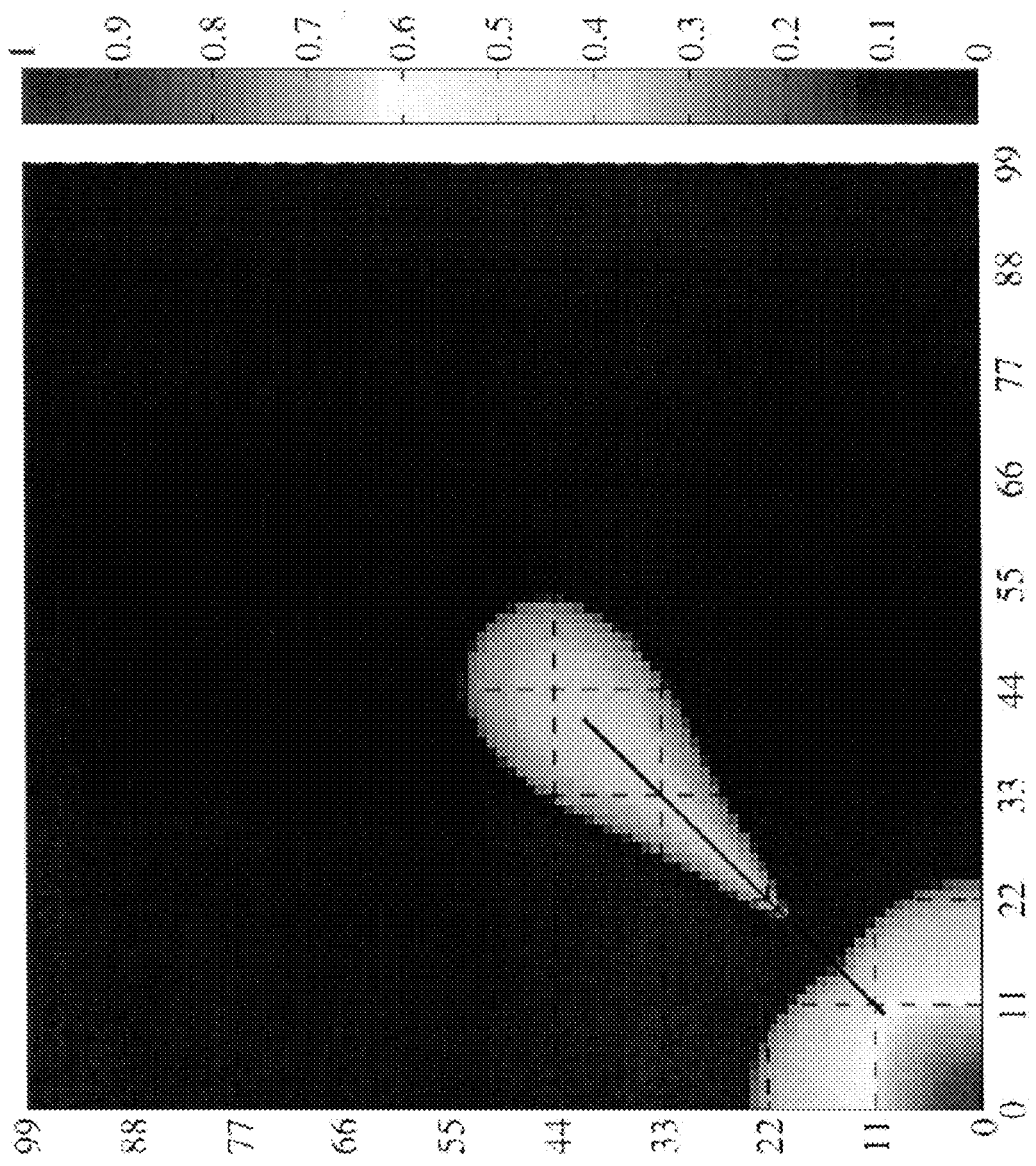
FIG. 22 shows a saturation map of for two phase flow in a fractured homogeneous domain, according to an embodiment of the present invention.

FIGS. 21 and 22 show results of two phase flow in homogeneous porous media with one fracture line obtained with the i-MSFV solver using the hierarchical fracture modeling approach based on scale separation. The fracture contains 57 segments that are $3\times10^3$ times more conductive than the porous media per unit area. The matrix grid has 99×99 fine cells, and for the i-MSFV method a 9×9 coarse matrix grid is employed. No-flow conditions are applied at all boundaries, an injector well with a constant dimensionless pressure value of 1 is located in fine cell (1,1), and production occurs out of fine cell (99,99) where the dimensionless pressure value is kept constant at 0. The injected phase is ten times less viscous than the displaced one. Quadratic relative permeabilities, $k_r$–$S^2/\mu$, are used for flow in the matrix, while in the fracture $k_r$=$S/\mu$ is employed. FIG. 21 shows a pressure map and FIG. 22 shows a saturation map, both of which are obtained after a pore volume injection (PVI) of 0.04.

Figure 23:
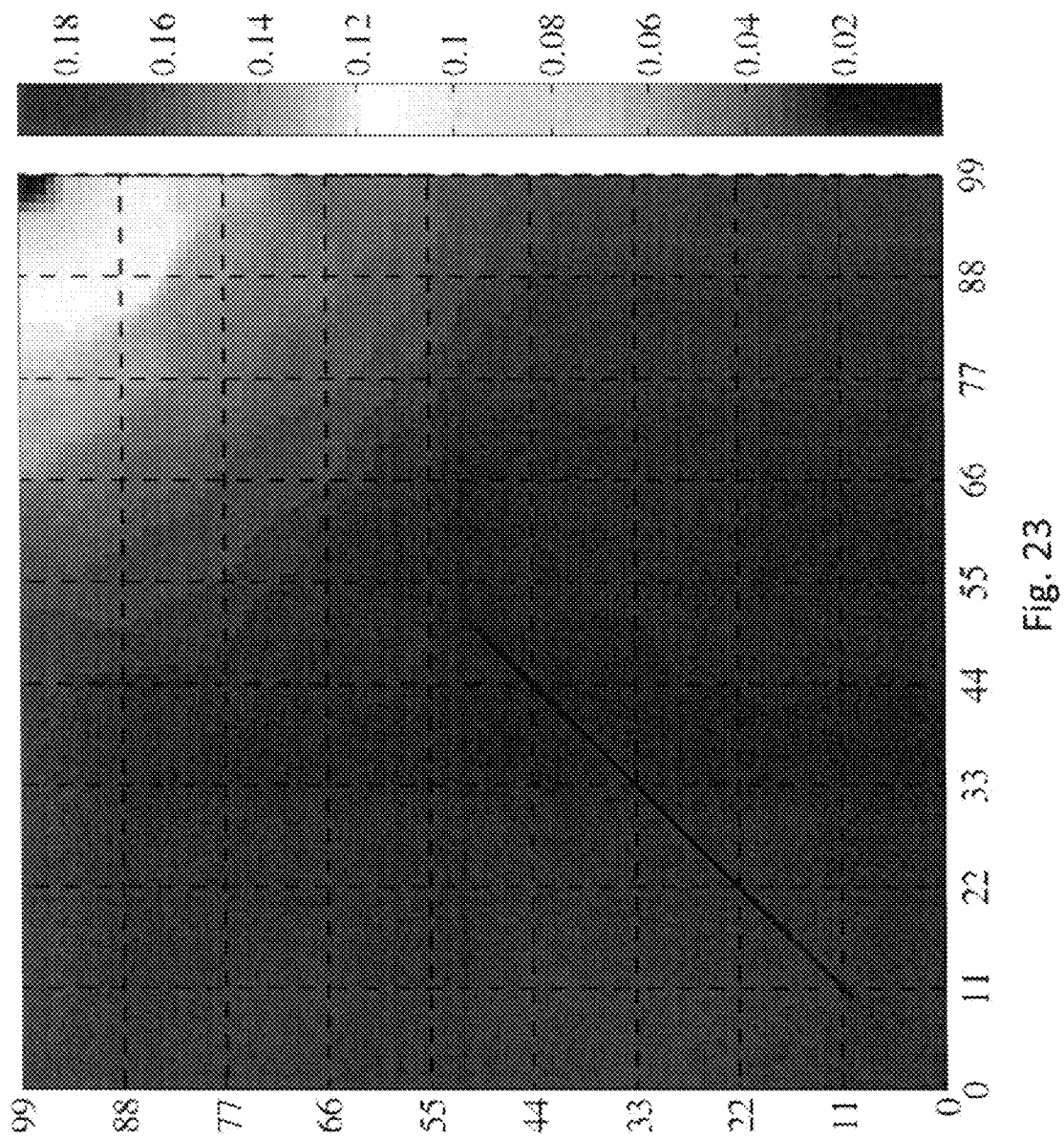
FIG. 23 shows a pressure map of for two phase flow in a fractured heterogeneous domain, according to an embodiment of the present invention.
Figure 24:
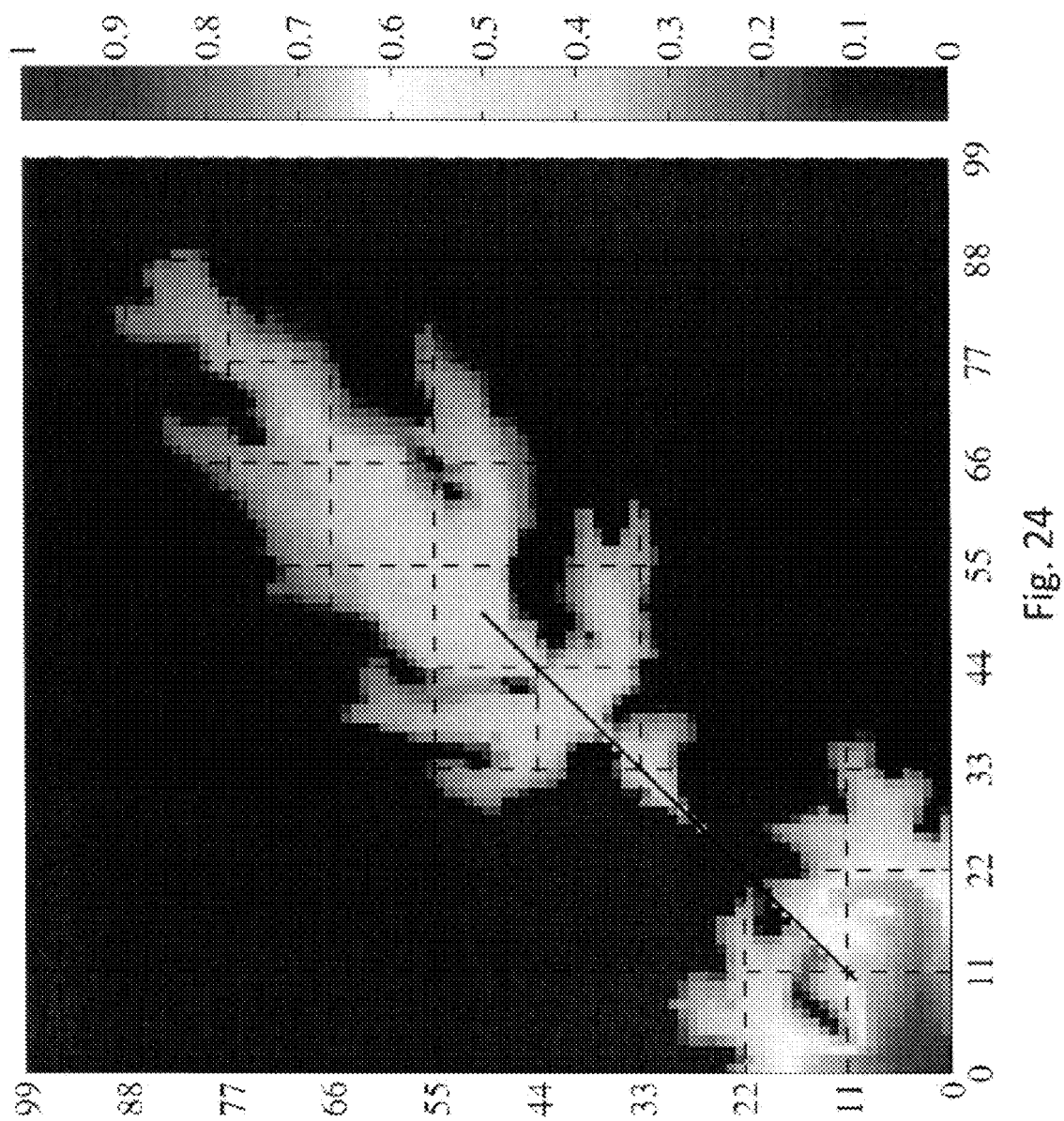
FIG. 24 shows a saturation map of for two phase flow in a fractured heterogeneous domain, according to an embodiment of the present invention.

FIGS. 23 and 24 show results of a similar example case with a heterogeneous matrix. In particular, FIG. 23 shows a pressure map and FIG. 24 shows a saturation map, both of which are obtained after a pore volume injection (PVI) of 0.09. For both of the example cases shown in FIGS. 21-24, fine-scale and multi-scale results are virtually identical, since here i-MSFV iterations were applied until the maximum fracture pressure change became extremely small ($10^{-4}$ in the homogeneous and $10^{-7}$ in the heterogeneous case).

Therefore, a hierarchical fracture modeling approach based on scale separation is disclosed herein. The fracture modeling approach is suitable for the MSFV framework as the fracture pressure is split into an average value and a deviation/remainder value. This splitting technique results in only one additional DOF for each connected fracture network being implicitly coupled with the matrix system. This results in much smaller coupled systems compared to the coupled systems used in previous proposed hierarchical approaches. For computation of the fracture deviation pressure a classical solver can be employed, since the corresponding systems tend to be much smaller than the globally coupled one.

Minimal modification of i-MSFV implementation is needed for unfractured reservoirs. The i-MSFV method acts as a multi-scale solver with local error control. Use of the i-MSFV method is an efficient, convergent multi-scale approach, which does not require full convergence in order to provide conservative fine-scale velocity fields. This can be exploited for adaptive strategies, which greatly enhance overall efficiency for realistic multi-phase flow simulations. When i-MSFV is implemented, the computational cost required for the solution of the global system with its additional DOFs is reduced. Local fracture functions are introduced to accurately capture fractures at the coarse-scale. In each coarse dual cell there exists only one local fracture function per overlapping network and one DOF per fracture network is added to the coarse-scale system.

Efficiency and accuracy of the proposed i-MSFV approach for fractured porous media was assessed for a wide range of example cases. These cases demonstrate that the combination of the i-MSFV method with sequential coupling of the global coarse system with the small systems for the fracture deviation pressure is very effective; especially for highly connective fractures. In particular, the convergence rate slows down if the fracture conductivity is reduced. This is due to only the average fracture pressure $\bar{p}^f$ appearing in the operator while the variation fracture pressure $\hat{p}^f$ is treated explicitly. For highly conductive fractures, $\hat{p}^f$ is small and therefore, the average pressure is a good approximation of the fracture pressure: For low fracture conductivities, pressure gradients inside the fractures are larger and thus, $\hat{p}^f$ is considerable. Therefore, the latter case can involve more iterations to fully converge.

Many modifications and variations of this invention can be made without departing from its spirit and scope, as will be apparent to those skilled in the art. For example, in some embodiments, more than one additional DOF for each fracture network in the matrix equation is introduced using higher order pressure splitting techniques. This can significantly improve the convergence rate in cases where the pressure gradients inside fractures are high, such as when there are large fractures and low fracture conductivities. The specific examples described herein are offered by way of example only, and the invention is to be limited only by the terms of the appended claims, along with the full scope of equivalents to which such claims are entitled.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

What is claimed is:

1. A computer-implemented method for simulating fluid flow in a fractured subterranean reservoir, the computer-implemented method comprising:
    (a) providing a reservoir model representative of a fractured subterranean reservoir, the reservoir model including porous matrix control volumes and a plurality of networks of fractures overlying the porous matrix control volumes, wherein each network of fractures comprises fracture control volumes, and wherein each fracture control volume of a particular network of fractures is highly connected to at least one other fracture control volume of the particular network of fractures;
    (b) for each network of fractures, splitting a pressure vector corresponding to the network of fractures into an average pressure value and remainder pressure values;
    (c) constructing a system of equations based on scale separation for pressure values in the porous matrix control volumes and the average pressure value of each network of fractures; and
    (d) for each network of fractures, solving sequentially the system of equations based on scale separation by:
        (i) approximating a pressure field on a coarse-scale grid responsive to a matrix pressure vector and the average pressure value for the corresponding network of fractures;
        (ii) obtaining a fine-scale pressure solution responsive to the pressure field on the coarse-scale grid;
        (iii) computing the remainder pressure values for the corresponding network of fractures;
        (iv) smoothing the fine-scale pressure solution; and
        (v) repeating steps (i) through (iv) until the remainder pressure values have converged to a convergence criterion.

2. The method of claim 1, wherein the system of equations based on scale separation comprises matrix equations and fracture equations coupled via flux interactions between the matrix control volumes and the fracture control volumes.

3. The method of claim 1, wherein the system of equations based on scale separation comprises fracture equations having the pressure vector for each network of fractures that is split into the average pressure value $\bar{p}^{f,i}$ and the remainder pressure values $\hat{p}^{f,i}$.

4. The method of claim 1, wherein an iterative multi-scale finite volume method is used for solving sequentially the system of equations based on scale separation.

5. The method of claim 1, wherein solving sequentially the system of equations based on scale separation comprises computing local fracture functions on the coarse-scale grid.

6. The method of claim 1, wherein the pressure field is approximated on the coarse-scale grid according to the following equation:

$$p^{m,\nu+1} \approx p^{tm,\nu+1} = \sum_{h=1}^{N_d}\left(\sum_{k=1}^{N_c}\Phi_k^h \bar{p}_k^{\nu+1} + \sum_{\beta=1}^{N_{fn}}\bar{p}^{f,\beta,\nu+1}\Phi_{f,\beta}^h \Phi^{h,\nu}\right)$$

where $\Phi_k^h$ represents basis functions, $\Phi_{f,\beta}^h$ represents fracture functions, and $\Phi^{h,\nu}$ represents correction functions.

7. The method of claim 1, further comprising computing a connectivity index between the fine scale grid and at least one fracture segment of a particular network of fractures prior to solving the system of equations.

8. A system for simulating fluid flow in a fractured subterranean reservoir, the system comprising:
   a database configured to store data comprising a reservoir model representative of a fractured subterranean reservoir, the reservoir model including porous matrix control volumes and a plurality of networks of fractures overlying the porous matrix control volumes, wherein each network of fractures comprises fracture control volumes, and wherein each fracture control volume of a particular network of fractures is highly connected to at least one other fracture control volume of the particular network of fractures;
   a computer processor; and
   a computer program configured to be executed by the computer processor and cause the computer processor to perform a method, the method comprising:
   (a) providing the reservoir model representative of the fractured subterranean reservoir;
   (b) for each network of fractures, splitting a pressure vector corresponding to the network of fractures into an average pressure value and remainder pressure values;
   (c) constructing a system of equations based on scale separation for pressure values in the porous matrix control volumes and the average pressure value of each network of fractures; and
   (d) for each network of fractures, solving sequentially the system of equations based on scale separation by:
   (i) approximating a pressure field on a coarse-scale grid responsive to a matrix pressure vector and the average pressure value for the corresponding network of fractures;
   (ii) obtaining a fine-scale pressure solution responsive to the pressure field on the coarse-scale grid;
   (iii) computing the remainder pressure values for the corresponding network of fractures;
   (iv) smoothing the fine-scale pressure solution; and
   (v) repeating steps (i) through (iv) until the remainder pressure values have converged to a convergence criterion.

9. The system of claim 8, wherein the system of equations based on scale separation comprises matrix equations and fracture equations coupled via flux interactions between the matrix control volumes and the fracture control volumes.

10. The system of claim 8, wherein the system of equations based on scale separation comprises fracture equations having the pressure vector for each network of fractures that is split into the average pressure value $\bar{p}^{f,i}$ and the remainder pressure values $\hat{p}^{f,i}$.

11. The system of claim 8, wherein the system of equations based on scale separation is solved sequentially using an iterative multi-scale finite volume method.

12. The system of claim 11, wherein solving sequentially the system of equations based on scale separation comprises computing local fracture functions on the coarse-scale grid.

13. The system of claim 8, wherein the pressure field is approximated on the coarse-scale grid according to the following equation:

$$p^{m,\nu+1} \approx p^{tm,\nu+1} = \sum_{h=1}^{N_d}\left(\sum_{k=1}^{N_c}\Phi_k^h \bar{p}_k^{\nu+1} + \sum_{\beta=1}^{N_{fn}}\bar{p}^{f,\beta,\nu+1}\Phi_{f,\beta}^h \Phi^{h,\nu}\right)$$

where $\Phi_k^h$ represents basis functions, $\Phi_{f,\beta}^h$ represents fracture functions, and $\Phi^{h,\nu}$ represents correction functions.

14. The system of claim 8, wherein the computer program is further configured to be executed by the computer processor and cause the computer processor to compute a connectivity index between the fine scale grid and at least one fracture segment of a particular network of fractures prior to solving the system of equations.

15. A computer program product, comprising a non-transitory computer usable medium having a computer readable program code embodied therein, the computer readable program code configured to be executed by a computer processor and cause the computer processor to perform a method for simulating fluid flow in a fractured subterranean reservoir, the method comprising:
   (a) providing a reservoir model representative of a fractured subterranean reservoir, the reservoir model including porous matrix control volumes and a plurality of networks of fractures overlying the porous matrix control volumes, wherein each network of fractures comprises fracture control volumes, and wherein each fracture control volume of a particular network of fractures is highly connected to at least one other fracture control volume of the particular network of fractures;
   (b) for each network of fractures, splitting a pressure vector corresponding to the network of fractures into an average pressure value and remainder pressure values;
   (c) constructing a system of equations based on scale separation for pressure values in the porous matrix control volumes and the average pressure value of each network of features; and
   (d) for each network of fractures, solving sequentially the system of equations based on scale separation by:
   (i) approximating a pressure field on a coarse-scale grid responsive to a matrix pressure vector and the average pressure value for the corresponding network of fractures;
   (ii) obtaining a fine-scale pressure solution responsive to the pressure field on the coarse-scale grid;
   (iii) computing the remainder pressure values for the corresponding network of fractures;
   (iv) smoothing the fine-scale pressure solution; and
   (v) repeating steps (i) through (iv) until the remainder pressure values have converged to a convergence criterion.

16. The computer program product of claim 15, wherein the system of equations based on scale separation comprises matrix equations and fracture equations coupled via flux interactions between the matrix control volumes and the fracture control volumes.

17. The computer program product of claim 15, wherein the system of equations based on scale separation comprises fracture equations having the pressure vector for each network of fractures that is split into the average pressure value $\bar{p}^{f,i}$ and the remainder pressure values $\hat{p}^{f,i}$.

18. The computer program product of claim 15, wherein the pressure field is approximated on the coarse-scale grid according to the following equation:

$$p^{m,v+1} \approx p'^{m,v+1} = \sum_{h=1}^{N_d}\left(\sum_{k=1}^{N_c} \Phi_k^h \bar{p}_k^{h,-v+1} + \sum_{\beta=1}^{N_{fn}} \bar{p}^{f,\beta,v+1}\Phi_{f,\beta}^h + \Phi^{h,v}\right)$$

where $\Phi_k^h$ represents basis functions, $\Phi_{f,\beta}^h$ represents fracture functions, and $\Phi^{h,v}$ represents correction functions.

19. The computer program product of claim 15, wherein the computer readable program code is further configured to be executed by the computer processor and cause the computer processor to compute a connectivity index between the fine scale grid and at least one fracture segment of a particular network of fractures prior to solving the system of equations.

20. The computer program product of claim 15, wherein the system of equations based on scale separation is solved sequentially using an iterative multi-scale finite volume method.

\* \* \* \* \*